(12) United States Patent  
Glick

(10) Patent No.: US 11,098,737 B1
(45) Date of Patent: Aug. 24, 2021

(54) ANALOG FLUIDIC DEVICES AND SYSTEMS

(71) Applicant: Facebook Technologies, LLC, Menlo Park, CA (US)

(72) Inventor: Casey Glick, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 90 days.

(21) Appl. No.: 16/455,715

(22) Filed: Jun. 27, 2019

(51) Int. Cl.
| | |
|---|---|
| *F15B 5/00* | (2006.01) |
| *F15B 3/00* | (2006.01) |
| *F15C 1/14* | (2006.01) |
| *G06F 3/01* | (2006.01) |

(52) U.S. Cl.
CPC .............. *F15C 1/14* (2013.01); *F15B 3/00* (2013.01); *F15B 5/00* (2013.01); *G06F 3/014* (2013.01); *Y10T 137/7768* (2015.04); *Y10T 137/7769* (2015.04)

(58) Field of Classification Search
CPC ......... Y10T 137/7768; Y10T 137/7769; G06F 3/014; F15C 1/14; F15B 3/00; F15B 5/00
USPC .............................. 137/489.5, 492
See application file for complete search history.

(56) References Cited

U.S. PATENT DOCUMENTS

| | | | | |
|---|---|---|---|---|
| 1,627,628 A | * | 5/1927 | Anderson | G05D 16/18 137/492 |
| 2,328,279 A | * | 8/1943 | Jones | F23D 14/60 236/80 R |
| 2,543,846 A | * | 3/1951 | Griswold | F16K 17/105 137/492 |
| 2,684,078 A | * | 7/1954 | Paulison, Jr. | G05D 7/03 137/414 |
| 2,731,032 A | * | 1/1956 | Hughes | G05D 16/0655 137/492 |
| 3,792,713 A | * | 2/1974 | Zadoo | F16K 31/363 137/486 |
| 3,920,040 A | * | 11/1975 | Powell | G05B 11/44 137/458 |
| 4,848,722 A | | 7/1989 | Webster | |
| 5,615,832 A | * | 4/1997 | Price | B05B 7/1404 137/489.5 |
| 5,738,333 A | * | 4/1998 | Cognevich | F16K 17/105 137/489.5 |

(Continued)

OTHER PUBLICATIONS

Pacchierotti et al., "Wearable Haptic Systems for the Fingertip and the Hand: Taxonomy, Review, and Perspectives", IEEE Transactions on Haptics, vol. 10, No. 4, May 9, 2017, pp. 580-600.

(Continued)

*Primary Examiner* — William M McCalister
(74) *Attorney, Agent, or Firm* — FisherBroyles, LLP

(57) ABSTRACT

In some examples, a device includes a fluidic circuit may be configured to receive a fluidic input (and optionally a fluidic bias) and to provide a fluidic output based on the fluidic input. In some examples, the fluidic output may be a fluidic difference output based on a difference (such as a pressure and/or flow difference) between the fluidic input and a fluidic bias. In some examples, a device includes a fluidic amplifier configured to receive the fluidic difference output, and to provide a device fluidic output based on the fluidic difference output. The device fluidic output may be provided to a fluidic load, which may include an actuator and/or a haptic device.

18 Claims, 22 Drawing Sheets

(56) References Cited

U.S. PATENT DOCUMENTS

| | | | |
|---|---|---|---|
| 5,762,102 A * | 6/1998 | Rimboym | F16K 17/105 137/102 |
| 6,406,605 B1 | 6/2002 | Moles | |
| 6,461,335 B1 | 10/2002 | Noecker | |
| 6,474,623 B1 | 11/2002 | Davies | |
| 6,823,895 B2 | 11/2004 | Hitchcock et al. | |
| 6,949,176 B2 | 9/2005 | Vacca et al. | |
| 7,138,976 B1 | 11/2006 | Bouzit et al. | |
| 8,844,570 B2 | 9/2014 | Glick | |
| 8,922,355 B2 | 12/2014 | Kusuura | |
| 9,132,425 B2 | 9/2015 | Wen et al. | |
| 9,371,965 B2 | 6/2016 | Devaraju et al. | |
| 2002/0014607 A1 | 2/2002 | Abromaitis | |
| 2002/0158217 A1 | 10/2002 | Inoue et al. | |
| 2003/0010946 A1 | 1/2003 | Furukawa et al. | |
| 2003/0141470 A1 | 7/2003 | Igarashi | |
| 2003/0196695 A1 | 10/2003 | O'Connor et al. | |
| 2004/0033108 A1 | 2/2004 | Raftis et al. | |
| 2004/0056220 A1 | 3/2004 | Raftis | |
| 2004/0118646 A1 | 6/2004 | Lun | |
| 2004/0182444 A1 * | 9/2004 | Lamont | G05D 16/163 137/492 |
| 2005/0049546 A1 | 3/2005 | Messerly et al. | |
| 2005/0268968 A1 * | 12/2005 | Hourtouat | G05D 16/163 137/492 |
| 2006/0058740 A1 | 3/2006 | Cise et al. | |
| 2006/0163506 A1 | 7/2006 | Cook et al. | |
| 2006/0243934 A1 | 11/2006 | Chung et al. | |
| 2007/0170382 A1 | 7/2007 | Li et al. | |
| 2007/0181835 A1 | 8/2007 | Hanada | |
| 2008/0087853 A1 | 4/2008 | Kees | |
| 2008/0264863 A1 | 10/2008 | Quake et al. | |
| 2009/0007969 A1 | 1/2009 | Gundel | |
| 2009/0121166 A1 | 5/2009 | Gabelgaard | |
| 2009/0145502 A1 | 6/2009 | Dirac et al. | |
| 2009/0302244 A1 | 12/2009 | Wedel | |
| 2010/0093559 A1 | 4/2010 | Fan et al. | |
| 2010/0170572 A1 | 7/2010 | Sahoo et al. | |
| 2010/0180970 A1 | 7/2010 | Welle | |
| 2010/0228222 A1 | 9/2010 | Williams et al. | |
| 2010/0260617 A1 | 10/2010 | Haertl | |
| 2010/0261137 A1 | 10/2010 | Boyd et al. | |
| 2011/0045599 A1 | 2/2011 | Erickson et al. | |
| 2011/0254672 A1 | 10/2011 | Ciesla et al. | |
| 2012/0039770 A1 | 2/2012 | Namkoong et al. | |
| 2012/0182135 A1 | 7/2012 | Kusuura | |
| 2012/0275929 A1 | 11/2012 | Salsman | |
| 2013/0156615 A1 | 6/2013 | Puleo et al. | |
| 2013/0234054 A1 | 9/2013 | Eijkelenberg et al. | |
| 2014/0062954 A1 | 3/2014 | Ciesla et al. | |
| 2014/0130920 A1 | 5/2014 | Fernandes et al. | |
| 2014/0134001 A1 | 5/2014 | Uchida et al. | |
| 2016/0228889 A1 | 8/2016 | Maruyama et al. | |
| 2016/0238040 A1 | 8/2016 | Gallo et al. | |
| 2016/0258543 A1 | 9/2016 | Van Den Bijgaart et al. | |
| 2016/0363997 A1 | 12/2016 | Black et al. | |
| 2017/0203028 A1 | 7/2017 | Carr et al. | |
| 2017/0300115 A1 | 10/2017 | Kerr et al. | |
| 2018/0018858 A1 | 1/2018 | Provancher et al. | |
| 2018/0038513 A1 | 2/2018 | Baldea et al. | |
| 2018/0209562 A1 | 7/2018 | Keller et al. | |
| 2019/0063619 A1 * | 2/2019 | Keller | F16K 31/02 |
| 2019/0212824 A1 | 7/2019 | Keller et al. | |

OTHER PUBLICATIONS

Sochol et al., "3D printed microfluidic circuitry via multijet-based additive manufacturing", Lab on a Chip, vol. 16, Jan. 4, 2016, pp. 668-678.

Gottmann et al., "Digital photonic production of micro structures in glass by in-volume selective laser-induced etching using a high speed micro scanner", ScienceDirect, Physics Procedia, vol. 39, Nov. 10, 2012, pp. 534-541.

Gottmann et al., "Selective Laser-Induced Etching of 3D Precision Quartz Glass Components for Microfluidic Applications—Up-Scaling of Complexity and Speed", MDPI, Micromachines, vol. 8, No. 4, Article 110, Apr. 1, 2017, pp. 1-10.

Hermans et al., "Selective, Laser-Induced Etching of Fused Silica at High Scan-Speeds Using KOH", JLMN—Journal of Laser Micro/Nanoengineering, vol. 9, No. 2, Jan. 6, 2014, pp. 126-131.

Frank et al., "Integrated Microfluidic Membrane Transistor Utilizing Chemical Information for On-Chip Flow Control", PLoS One, vol. 11, No. 8, Aug. 29, 2016, pp. 1-17.

Eddington et al., "Flow control with hydrogels", ScienceDirect, Advanced Drug Delivery Reviews, vol. 56, No. 2, Feb. 10, 2004, pp. 199-210.

Grayson et al., "A BioMEMS Review: MEMS Technology for Physiologically Integrated Devices", Proceedings of the IEEE, vol. 92, No. 1, Nov. 8, 2004, pp. 6-21.

Mohan et al., "Design considerations for elastomeric normally closed microfluidic valves", ScienceDirect, Sensors and Actuators B: Chemical, vol. 160, No. 1, Dec. 15, 2011, pp. 1216-1223.

Perdigones et al., "Correspondence Between Electronics and Fluids in MEMS: Designing Microfluidic Systems Using Electronics", IEEE Industrial Electronics Magazine, vol. 8, No. 4, Dec. 12, 2014, 12 pages.

Zhang et al., "Microfluidic Passive Flow Regulatory Device with an Integrated Check Valve for Enhanced Flow Control", MDPI, Micromachines, vol. 10, No. 10, Article 653, Sep. 27, 2019, pp. 1-12.

Thorsen et al., "Microfluidic Large-Scale Integration", Science, vol. 298, Issue 5593, Oct. 18, 2002, pp. 580-584.

Rinderknecht et al., "Combined Tendon Vibration and Virtual Reality for Post-Stroke Hand Rehabilitation", IEEE World Haptics Conference (IEEE WHC), Apr. 14, 2013, 6 pages.

Provancher et al., "Tactile Perception of Rotational Sliding", Second Joint EuroHaptics Conference and Symposium on Haptic Interfaces for Virtual Environment and Teleoperator Systems (WHC'07), Mar. 22, 2007, 6 pages.

* cited by examiner

ANALOG FLUIDIC DEVICES AND SYSTEMS

BACKGROUND

Fluidic devices may be used to control the flow and pressure of fluids. It would be useful to have improved pressure and flow control of fluids in fluidic applications.

SUMMARY

As will be described in greater detail below, the instant disclosure describes fluidic devices, systems, and methods. In some examples, a fluidic device provides a fluidic output (which may include an output pressure and/or output flow rate) that may be approximately linearly dependent on a fluidic input (such as an input pressure and/or input flow rate).

In some examples, a method includes receiving a fluidic input (e.g., having a pressure, flow rate, mechanical displacement, or some combination thereof), and generating a fluidic output (having a pressure, flow rate, mechanical displacement, or some combination thereof), where the fluidic output is substantially proportional to the fluidic input. In some examples, a method is performed using, for example, partial actuation of one or more relative area valves. In some examples, an input includes a fluidic input having a pressure and/or a flow rate, and an output includes a fluidic output having an output pressure and/or an output flow rate. In some examples, a mechanical input may be used to provide a fluidic input (e.g., an input pressure and/or an input flow rate). In some examples, a fluidic output pressure and/or a fluidic output flow rate may be used to generate a mechanical output, such as an actuation, haptic feedback or other human-perceptible output. In some examples, methods may include pressure-based feedback. Examples may also include apparatus and systems configured to perform such methods.

In some examples, an apparatus includes a fluidic circuit configured to receive a fluidic input and provide a fluidic output. A fluidic circuit may include one or more fluidic valves. In some examples, a fluidic valve includes a source and a drain, and a channel between the source and the drain through which fluid passes. The fluid may pass from source to the drain, so that the fluid pressure at the source may be higher than the fluid pressure at the drain, so that in the absence of any channel closure the fluid passes from the source to the drain. The fluidic valve may also include a gate, which may include a gate transmission element that may be urged by a gate pressure either into the channel or out of the channel. In some examples, the gate transmission element may receive gate pressures from two or more surfaces, and the gate transmission element movement may result from the sum of the forces received, for example, as determined by the product of pressures and the respective areas over which each pressure acts. The gate transmission element may receive pressure from fluid in the channel which tends to urge the gate transmission element out of the channel, opening the valve, and the gate transmission element may receive gate pressure on an area of the gate that tends to urge the gate transmission element into the channel, closing the valve. The forces on the gate transmission element may be the product of the pressure and the area over which the pressure acts. A fluidic valve may be configured so that the gate area over which the gate pressure is received is appreciably larger than the gate transmission element area in the channel over which channel fluid pressure is received. This relative area ratio allows a relatively smaller pressure to control the flow of fluid at a relatively larger pressure. A pressure gain may be obtained that is related to the relative area ratio. A fluidic valve taking advantage of this relative area ratio may be termed a relative area valve.

In some examples, a device includes a fluidic valve, such as a relative area fluidic valve, and is configured to receive a fluidic input and provide a fluidic output. A fluidic circuit may include one or more fluidic valves. A fluidic input may include an input pressure and/or an input flow rate. A fluidic output may include an output pressure and/or an output flow rate. In some examples, the fluidic input may have a generally proportional relationship with the fluidic input. For example, an output flow rate and/or an output pressure may be generally proportional to an input pressure and/or input flow rate. In some examples, the relationship between fluidic input and fluidic output may be approximately or essentially linear, possibly within limiting ranges that may be related to the source pressure available to the device. In some examples, a device may include a relative area fluidic valve that has a pressure gain based on the relative area ratio (as discussed further herein).

In some examples, a device includes a fluidic differential circuit configured to receive a fluidic input and a fluidic bias, and provide a fluidic difference output correlated with a difference between the fluidic input and the fluidic bias. A device may further include a fluidic amplifier, configured to receive the fluidic difference output and provide a device fluidic output based on the fluidic difference output. The he fluidic differential circuit may include a first fluidic valve and a second fluidic valve. The first and second fluidic valves may each have a source, a drain, and a gate. A first fluidic input may be connected to the first gate, a second fluidic input (which may be a fluidic bias) is connected to the second gate. A fluidic difference output may be obtained by a fluidic coupling to the first source or the second source. A device may further include a fluidic current mirror, the fluidic current mirror being configured to balance a first fluid flow to the first fluidic valve and a second fluid flow to the second fluidic valve. A fluidic current mirror may include a pair of fluidic valves. In some examples, the fluidic amplifier is a buffer fluidic amplifier having an approximately unity fluidic pressure gain and appreciable flow gain. In some examples, the fluidic amplifier receives the fluidic difference output at an amplifier input pressure and an amplifier input flow rate, and provides the device fluidic output at an amplifier (or device) output pressure and an amplifier (or device) output flow rate. For approximately unity pressure gain, the amplifier output pressure is approximately equal to the amplifier input pressure. For appreciable flow gain, the amplifier output flow rate may appreciably greater than the amplifier input flow rate. In some examples, the fluidic amplifier includes only a single fluidic device, such as a fluidic valve. In some examples, the fluidic amplifier includes a pair of normally open fluidic valves. The fluidic input may be received by a fluidic input circuit through which the fluidic input passes. The fluidic input circuit may include a flow restriction, such as an aperture. The fluidic output may be received by a fluidic output circuit, which may include an actuator.

In some examples, a device includes a fluidic differential circuit configured to receive a fluidic input and a fluidic bias, and provide a fluidic difference output correlated with a difference between the fluidic input and the fluidic bias, wherein the fluidic differential circuit includes a first fluidic valve having a first source, a first drain, and a first gate, and a second fluidic valve having a second source, a second drain, and a second gate. The fluidic input may be connected to the first gate, the fluidic bias connected to the second gate, and the fluidic difference output obtained by a fluidic coupling to the first source or the second source. A device may further include a fluidic amplifier, configured to receive the fluidic difference output and provide a device fluidic output based on the fluidic difference output. The fluidic amplifier may have a fluidic pressure gain of approximately unity.

In some examples, the output from a device, such as a fluidic amplifier, may be connected to a haptic device, the haptic device receiving a fluidic output signal that is correlated with the fluidic difference output. A device fluidic output may include a fluctuating flow and/or pressure.

In some examples, a method includes receiving a fluidic input signal, and providing, using a fluidic amplifier, a fluidic output signal correlated with the fluidic input signal. The flow rate and/or pressure of the output signal may be amplified to provide a fluidic output signal. A fluidic output signal may be provided to an actuator and/or a haptic device. A fluidic circuit may include a pair of fluidic valves, and optionally may further include a fluidic flow mirror to balance flows to each of the pair of fluidic devices. In some examples, a method includes amplifying a pressure of a fluidic input using a fluidic amplifier, and then amplifying the flow rate of the fluidic input using a fluidic buffer amplifier.

In some examples, a method includes receiving a fluidic input signal, receiving a reference fluidic input signal (such as a bias pressure), and providing, using a fluidic difference circuit, a fluidic difference output correlated with a difference between the fluidic input signal and the reference fluidic input signal. The flow rate and/or pressure of the fluidic difference output may be amplified to provide a fluidic output signal. A fluidic output signal may be provided to an actuator and/or a haptic device. A fluidic circuit may include a pair of fluidic valves, and optionally may further include a fluidic flow mirror to balance flows to each of the pair of fluidic devices.

In some examples, a computer-implemented method includes controlling a fluidic source to provide a fluidic input signal, and then amplifying the fluidic input signal using a fluidic circuit to provide a haptic signal to a person. In some examples, a computer-implemented method includes receiving a sensor signal from a sensor, and in response to the sensor signal controlling a fluidic source to provide a fluidic input signal to a fluidic circuit. The fluidic amplifier may then amplify the fluidic input signal to provide a haptic signal to a person.

In some examples, a system includes a device, such as a fluidic device as described herein, at least one physical processor, physical memory including computer-executable instructions that, when executed by the physical processor, cause the physical processor to control a fluidic input signal to a fluidic circuit.

In some examples, a non-transitory computer-readable medium includes one or more computer-executable instructions that, when executed by at least one processor of a computing device, cause the computing device to control a fluidic input signal to a fluidic circuit, the fluidic circuit amplifying the fluidic input signal, for example, to provide a fluidic output signal to a fluidic load, which may include, for example, an actuator and/or haptic device.

In some examples, a computer-implemented method for providing a haptic signal may include electrical control of a fluidic pump, aperture, or other flow restriction such as a valve. In some examples, a system for fluidic provision of haptic feedback may include several modules stored in memory, including a module for controlling a fluidic input signal to a fluidic circuit. In some examples, an example method may be encoded as computer-readable instructions on a computer-readable medium. For example, a computer-readable medium may include one or more computer-executable instructions that, when executed by at least one processor of a computing device, may cause the computing device to control a fluidic input signal provided to a fluidic circuit. A fluidic circuit may include a fluidic difference circuit configured to provide a fluidic difference output based on a difference between the first fluidic input signal and the second fluidic input signal. In some examples, the difference between the first fluidic input signal and the second fluidic input signal may be pressure difference. A fluidic circuit may include a fluidic buffer amplifier configured to amplify the flow rate of a fluidic input, while in some cases not appreciably amplifying the pressure of the fluidic input, to provide a fluidic output signal. The fluidic output signal may be provided to a haptic device and/or an actuator. In some examples, a method may further include providing a fluidic circuit that includes a pair of fluidic valves, and may further include using a fluidic flow mirror to balance flows to each of the pair of fluidic devices.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION OF EXEMPLARY EMBODIMENTS

The present disclosure is generally directed to fluidic valves, fluidic circuits, applications of fluidic circuits, and methods of operating fluidic circuits, amongst other aspects. As will be explained in greater detail below, embodiments of the instant disclosure may include a fluidic difference amplifier.

In some examples, fluidic devices may be used in systems such as virtual reality (VR) and augmented reality (AR) systems. In some examples, a system may include a wearable device includes a fluidic device and a haptic device. The wearable device may be (or include) a glove, a wristband (e.g., a wrist-mounted device such as a wristwatch, including a wristband), a strap (e.g., a strap around any portion of the body, such as the chest), headwear (e.g., a helmet), eyewear (such as goggles, glasses and the like), footwear (e.g., a shoe), and the like. In some examples, a system may include a controller that is held by a user, and may provide haptic feedback. A haptic device may be configured to provide any type of touch-discernable feedback. A haptic device may receive a fluidic haptic signal, for example, the output of a fluidic amplifier. A haptic device may convert time-dependent variations of the fluidic haptic signal into for example, perceptible vibrations. In some examples, an apparatus may provide a fluidic output, which may include an output pressure and/or output flow, which may induce a human-perceptible mechanical response in an actuator or haptic component. In some examples, a wearable item, such as a glove, wristband, belt, helmet, or other device, may include a fluidic device and a haptic component, the fluidic device providing a time-varying output pressure and/or output flow to the haptic component. In some examples, an augmented reality (AR) or virtual reality (VR) device may include one or more fluidic devices as described herein, for example, used to provide actuation and/or haptic feedback.

The following will provide, with reference to FIGS. 1-20, detailed descriptions of example fluidic valves, fluidic circuits, applications of fluidic circuits, and methods of operating fluidic circuits, amongst other aspects. In some examples, an analog fluidic circuit may include one or more fluidic valves, such as one or more relative area fluidic valves.

Figure 1A:
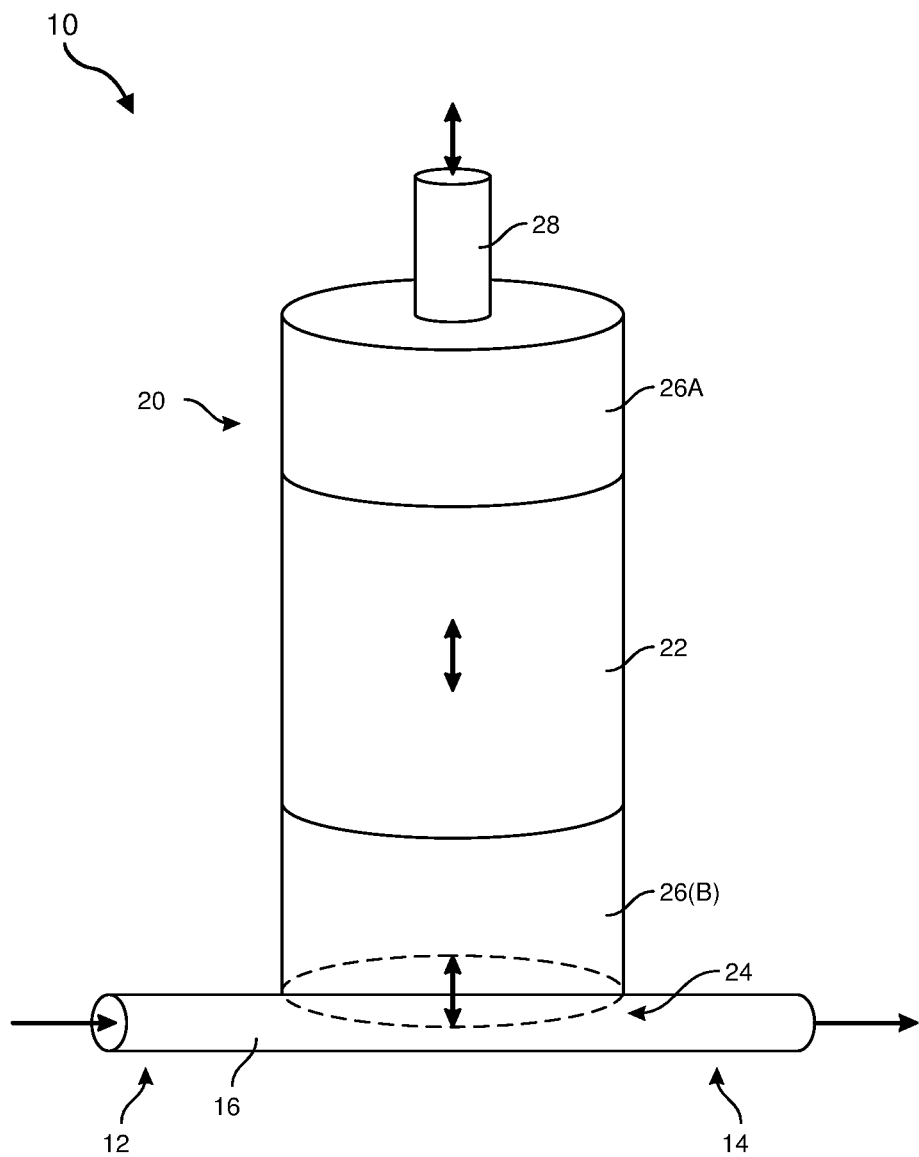
FIG. 1A depicts an example fluidic valve in accordance with some embodiments.
Figure 1B:
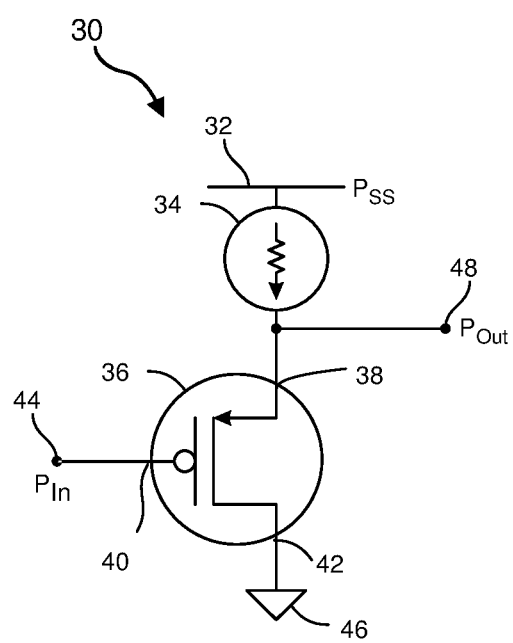
FIG. 1B depicts a fluidic schematic drawing showing a fluidic circuit including an example fluidic valve, in accordance with some embodiments.

Example fluidic devices may include fluidic differential amplifiers, such as described below in relation to, for example, FIGS. 2A-2C, FIGS. 3A-3B, and FIG. 4. FIGS. 1A-1B depict an example fluidic valve and an example fluidic schematic, respectively. Fluidic circuits are represented by schematics as described in relation to FIG. 1B. Example fluidic devices may include fluidic amplifiers which may be based on a single fluidic valve (e.g., as described below in relation to FIGS. 5A-5E. Fluidic circuits may be based on various configurations of fluidic valves, such as fluidic valves discussed herein, such as in relation to FIGS. 6A-6E, FIGS. 7A-7B, and FIG. 8. A fluidic amplifier circuit may also be configured as a fluidic oscillator, for example, by provision of feedback from a device fluidic output to a device input (as the terms device fluidic output and device input may be used in relation to a fluidic amplifier circuit), and representative examples are discussed herein, for example, in relation to FIG. 9. Examples also include systems, such as haptic systems discussed herein, for example, in relation to FIGS. 10A-10C and FIGS. 13-17, and/or augmented reality/virtual reality systems as discussed in relation to, for example, FIGS. 15-20. Examples also include methods, for example, as discussed in relation to FIGS. 11 and 12.

FIG. 1A is an illustration of an exemplary fluidic control system that may be used in connection with embodiments of this disclosure, which may be termed a fluidic valve. Examples of the present disclosure may include haptic fluidic systems that involve the control (e.g., stopping, starting, restricting, increasing, etc.) of fluid flow through a fluid channel. The control of fluid flow may be accomplished with a fluidic valve. FIG. 1A shows a schematic diagram of a fluidic valve 10 for controlling flow through a fluid channel 16, according to at least one embodiment of the present disclosure. Fluid from a fluid source (e.g., a pressurized fluid source, a fluid pump, etc.) may flow through the fluid channel 16 from an inlet port 12 to an outlet port 14, which may be operably coupled to, for example, a fluid-driven mechanism, another fluid channel, or a fluid reservoir.

Fluidic valve 10 may include a gate 20 for controlling the fluid flow through fluid channel 16. Gate 20 may include a gate transmission element 22, which may be a movable component that is configured to transmit an input force, pressure, or displacement to a restriction region 24 to restrict or stop flow through the fluid channel 16. Conversely, in some examples, application of a force, pressure, or displacement to gate transmission element 22 may result in opening restriction region 24 to allow or increase flow through the fluid channel 16. The force, pressure, or displacement applied to gate transmission element 22 may be referred to as a gate force, gate pressure, or gate displacement. Gate transmission element 22 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1A, gate 20 of fluidic valve 10 may include one or more gate terminals, such as an input gate terminal 26A and an output gate terminal 26B (collectively referred to herein as "gate terminals 26") on opposing sides of gate transmission element 22. Gate terminals 26 may be elements for applying a force (e.g., pressure) to gate transmission element 22. By way of example, gate terminals 26 may each be or include a fluid chamber adjacent to gate transmission element 22. Alternatively or additionally, one or more of gate terminals 26 may include a solid component, such as a lever, screw, or piston, that is configured to apply a force to gate transmission element 22.

In some examples, a gate port 28 may be in fluid communication with input gate terminal 26A for applying a positive or negative fluid pressure within the input gate terminal 26A. A control fluid source (e.g., a pressurized fluid source, a fluid pump, etc.) may be in fluid communication with gate port 26 to selectively pressurize and/or depressurize input gate terminal 26A. In additional embodiments, a force or pressure may be applied at the input gate terminal 26A in other ways, such as with a piezoelectric element, flexoelectric element. an electromechanical actuator, or the like.

In the embodiment illustrated in FIG. 1A, pressurization of the input gate terminal 26A may cause the gate transmission element 22 to be displaced toward restriction region 24, resulting in a corresponding pressurization of output gate terminal 26B. Pressurization of output gate terminal 26B may, in turn, cause restriction region 24 to partially or fully restrict to reduce or stop fluid flow through the fluid channel 16. Depressurization of input gate terminal 26A may cause gate transmission element 22 to be displaced away from restriction region 24, resulting in a corresponding depressurization of the output gate terminal 14. Depressurization of output gate terminal 26B may, in turn, cause restriction region 24 to partially or fully expand to allow or increase fluid flow through fluid channel 16. Thus, gate 20 of fluidic valve 10 may be used to control fluid flow from inlet port 12 to outlet port 14 of fluid channel 16.

FIG. 1B shows a schematic diagram of an example fluidic circuit including a fluidic valve, such as the fluidic valve illustrated in FIG. 1A. The fluidic circuit 30 includes a circuit source pressure $P_{SS}$ 32, flow controller 34, fluidic valve 36 having a source 38, gate 40, and drain 42. The source 38 is connected to the flow controller 34. The drain 42 is connected to the fluidic ground 46, represented by an inverted triangle. The fluidic ground is at a lower pressure, and may be at ambient pressure and may be a negative pressure. The input pressure $P_{in}$ is received at inlet 44, and is connected to gate 40. In relation to the example fluidic valve described in FIG. 1A, the source 38 corresponds to the inlet port 12 of the fluidic valve, into which fluid flows. The drain 42 corresponds to the outlet port 14 of the fluidic valve. The gate 40 corresponds to a port connected to gate 20 of the fluidic valve of FIG. 1A. In the schematic diagram of FIG. 1B, the solid lines represent fluid channels, through which fluid may flow. A fluid channel may be provided by a tube, conduit, pipe, or other channel through which fluid may flow or through which fluid pressure may be conveyed. In FIG. 1B, the fluid pressure tends to decrease going downwards through the figure (as illustrated). As typically illustrated, in fluidic schematic diagrams, fluid flows from the circuit source pressure (typically drawn at or near the top of the schematic) to the fluidic ground (typically drawn at or near the bottom of the schematic). The rate of fluid flow through the fluidic valve 36 may be controlled by an input pressure applied to the gate 40 of the fluidic valve. The flow controller 34 may include a restriction, such as an orifice having a reduced cross-sectional area compared with the fluid channels. In some examples, a flow restriction may be illustrated by a zig-zag line. In some examples, fluidic ground may also be referred to as the circuit drain, as fluid flows out of the circuit through the circuit drain to the fluidic ground. In some examples, a pump may recirculate fluid from the circuit drain at a relatively low pressure to circuit source at a relatively high pressure.

Figure 2A:
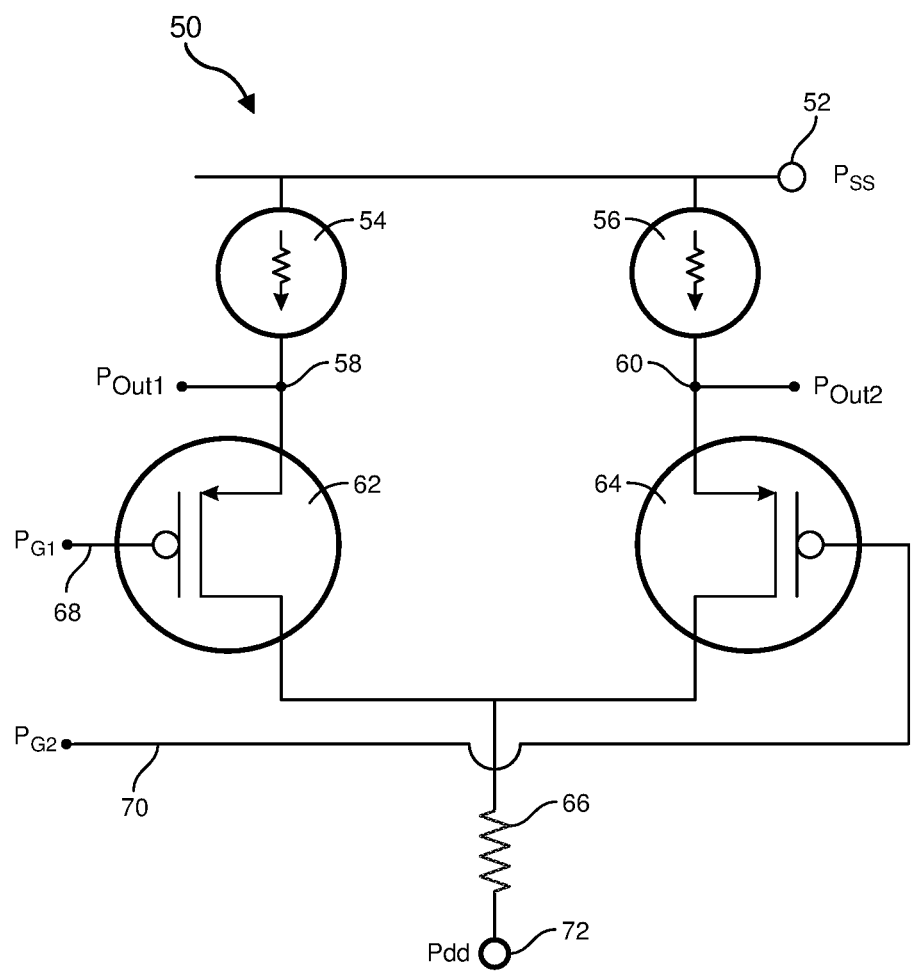
FIGS. 2A-2C are schematics of fluidic amplifiers in accordance with some embodiments.

FIG. 2A shows a fluidic amplifier configured as a differential pair. In fluidic circuit schematics such as shown in FIG. 1, the lines represent fluid channels through which a fluid may flow, or through which fluid pressure may be conveyed. The fluidic circuit shown generally at 50 includes a first fluidic valve 62 and a second fluidic valve 64. The source, drain, and gate of the fluidic valve are as described elsewhere, for example, in relation to FIG. 1B. $P_{SS}$ is a source pressure, received at a fluid connector at circuit inlet 52, and is connected to the source of each of the first and second fluidic valves 62 and 64 through first flow control 14 and second flow control 16, respectively. $P_{G1}$ is a first gate pressure, connected to the gate of the first fluidic valve through fluid channel 68. $P_{G2}$ is a second gate pressure, connected to the gate of the second fluidic valve through fluid channel 70. A fluid channel may include any fluid passageway, such as a tube, channel, or any other structure that fluid may pass through. Fluidic inputs may be applied to the fluidic valve gates through fluid channels 68 and 70, a fluidic outputs may be obtained from near the source of each fluidic valves, at 58 and 60. $P_{DD}$ represents the drain pressure, which may be lower than the source pressure. The drain of each of the first and second fluidic valves (62 and 64) is connected to circuit drain (e.g., fluidic ground) 72, in this example, through fluid channel flow restrictor 26. Fluid may flow from the circuit inlet 52 through each of the fluidic valves and to the circuit drain 72 (the fluid ground) 72. The fluid flow rate through each of the fluidic valves may be controlled by respective gate pressures. In some examples, each flow controller may include an orifice, and the flow restriction provided by the orifice may be greater than that provided by the fluidic valve. In some examples, the flow controllers may be provided by a flow mirror as discussed further below.

In this example, the drain pressure is approximately the same for both fluidic valves, and the input flow may be configured to be the same for both fluidic valves, for example, using a fluidic flow mirror (which may also be termed a current mirror) to provide the first and second flow controls. Therefore, flow through the fluidic valve may be balanced by a change in source pressure. Additionally, if the drain pressure drops from a change in control pressure on one side, the source pressure drops on the other side to balance.

For increases in the first gate pressure, the first drain pressure may rise and the second drain pressure may fall (and vice-versa). This output pressure of the fluidic amplifier may be responsive to the difference in input pressures (e.g., the difference between the first and second gate pressures). This configuration may help in the rejection of common mode changes to the gate pressures of the fluidic valves so that the output is less responsive to absolute input pressures than the difference between them. This example differential fluidic circuit configuration including two fluidic valves may be termed a fluidic differential pair.

Figure 2B:
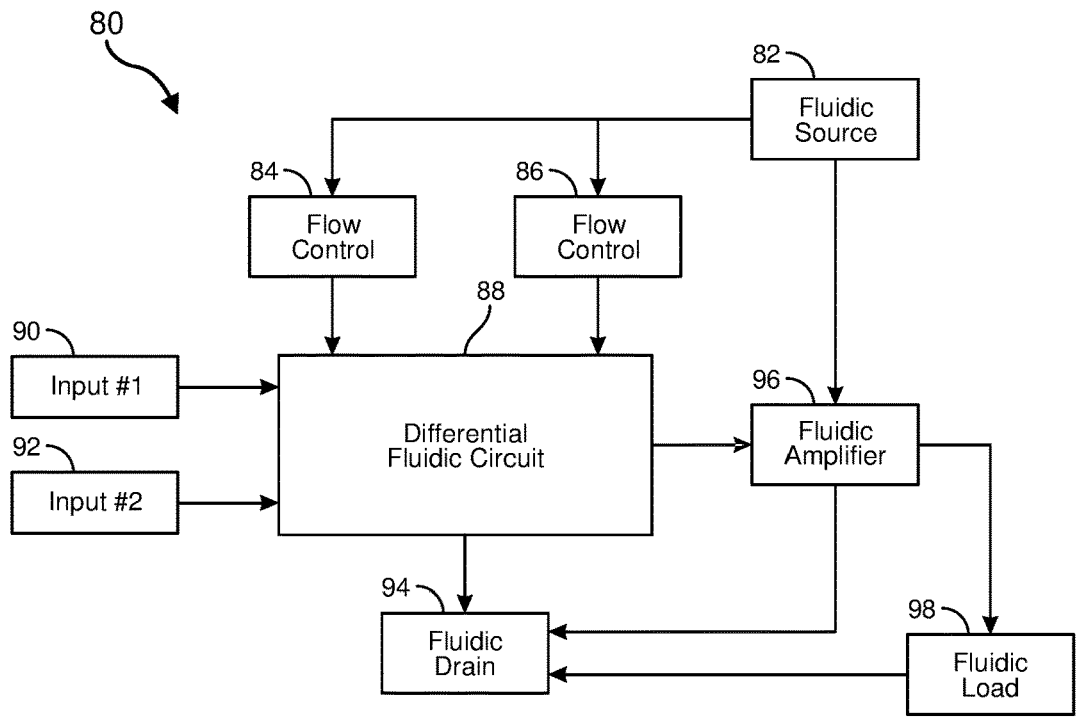

FIG. 2B shows a block diagram of a fluidic circuit 80, including fluidic source 82, and first and second flow controls 84 and 86 connecting the fluidic source to differential fluidic circuit 56. The differential fluidic circuit 86 is connected to a fluidic drain 64 and receives first and second fluidic inputs 90 and 92 respectively. In this example, an output of the differential fluidic circuit is connected to a fluidic amplifier 96. The fluidic amplifier may receive the output of the differential fluidic circuit and provides a device fluidic output (sometimes referred to as a fluidic output) to a fluidic load 98. The fluidic amplifier is shown connected to the same fluidic source and drain as the differential fluidic circuit, though this is an optional arrangement. The same or different fluidic sources and/or drains may be used for different portions of a fluidic circuit.

Figure 2C:
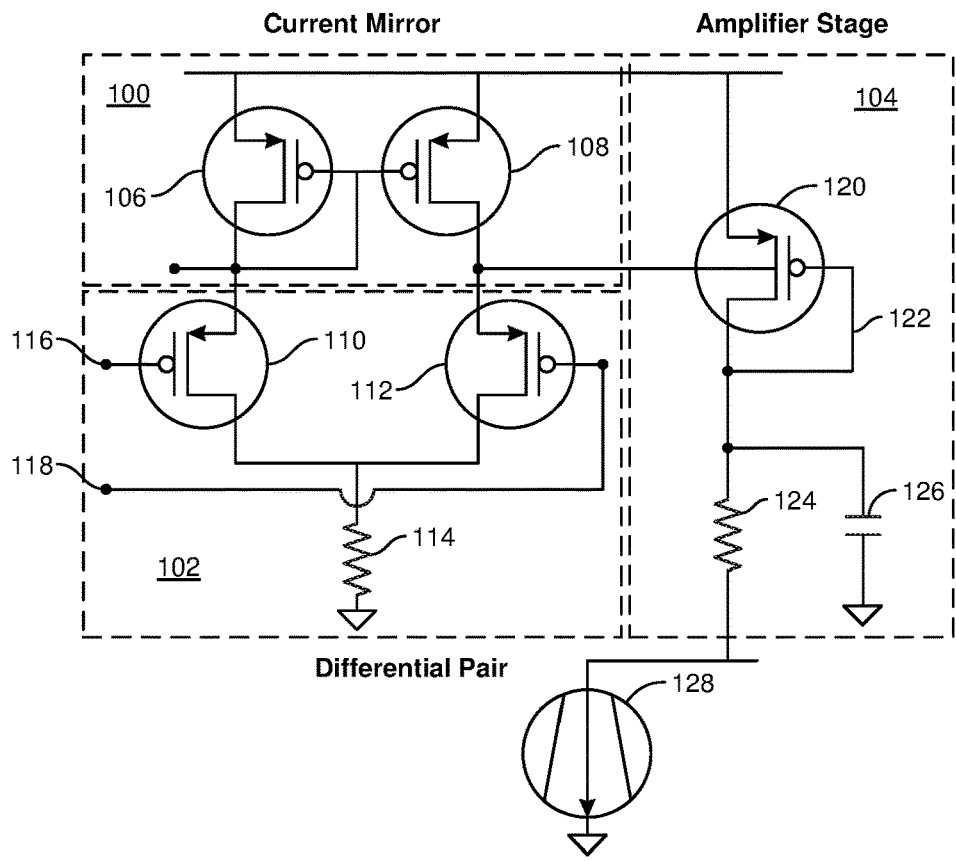

FIG. 2C shows an example implementation of the circuit of FIG. 2A, including a fluid flow mirror (which may also be termed a current mirror) 100, differential pair 102, and amplifier stage 104. The flow mirror includes fluidic valve 106 and fluidic valve 108. These provide the flow controls shown in FIG. 2B, and are similar to those discussed above in relation to FIG. 1. The differential pair 100 includes fluidic valves 110 and 112, and is also similar to the fluidic circuit discussed above in relation to FIG. 2A. The output of the differential pair is obtained from near the source terminal of fluidic valve 112, and connects to the input of the amplifier stage 104. The amplifier stage 104 includes fluidic valve 120, which has a common drain configuration discussed further below in relation to FIG. 5A. The gate of the fluidic valve is connected to the drain through fluid channel 122. The drain outputs through a flow restrictor 124 to a device drain 128. The output is obtained between the drain of fluidic valve 120 and the flow restrictor 124, and the output is provided to load 126. In some examples, the load is external to the amplifier stage, but is shown here within the amplifier stage for illustrative convenience.

In some examples, bias control may be introduced into the interstitial region (which may sometimes be referred to as the exhaust region) of the fluidic valves used for the flow mirror, to control the amount of current flowing into the differential pair circuit. The common tail flow restrictor 114 may increase the common mode rejection ratio of the fluidic differential pair circuit but lowers overall fluid flow. The fluidic bias may also be modified to adjust the range of fluidic output (e.g., range in variations in output pressure or output flow rate).

In some examples, a fluidic device may include a flow mirror, which may also be termed a current mirror. The flow mirror may be combined with any other fluidic circuit, such as a fluidic differential pair, other differential fluidic circuit, or any other fluidic circuit.

In example fluidic circuit diagrams, a ground symbol such as an inverted triangle may represent a fluidic drain for a device, and may be at atmospheric pressure, or other reference or ambient pressure level. For example, fluidic load 126 is shown as connected between the drain of fluidic valve 120 and a ground symbol (an inverted triangle). The fluidic drain may be at the same pressure (e.g., at atmospheric pressure, a pressure below atmospheric, or any other pressure less than the source pressure). Source and drain pressures may represent any pressure from a low pressure (e.g., a near-vacuum pressure) or a negative pressure, to a relatively high pressure (e.g., some multiple of atmospheric pressure). As used in representative examples, the source pressure is the higher pressure (relative to the drain pressure) and fluid flows in the direction of source to drain.

Figure 3A:
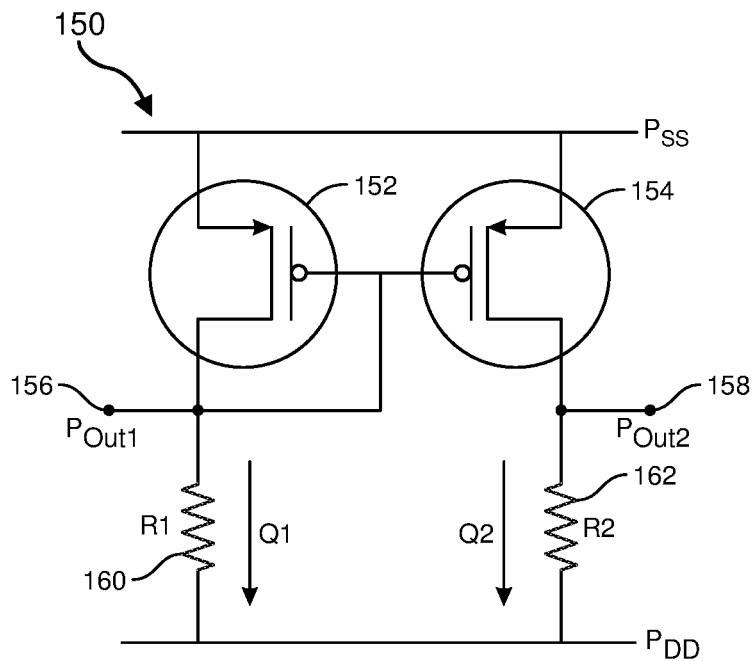
FIGS. 3A-3B are schematics of fluidic amplifiers using fluidic valves, in accordance with some embodiments.

FIG. 3A shows fluidic circuit 150 configured as a fluidic flow mirror. The fluidic circuit includes first and second fluidic valves 152 and 154 respectively. Each fluidic valve has a source connected to source pressure $P_{SS}$ and a drain connected through first flow restrictor 160 (denoted R1) or second flow restrictor 162 (denoted R2), respectively, to drain pressure ($P_{DD}$). There are first and second pressure outputs $P_{Out1}$ and $P_{Out2}$ at 156 and 158 respectively. The designation Q1 and Q2 refer to respective fluidic flows.

Figure 3B:
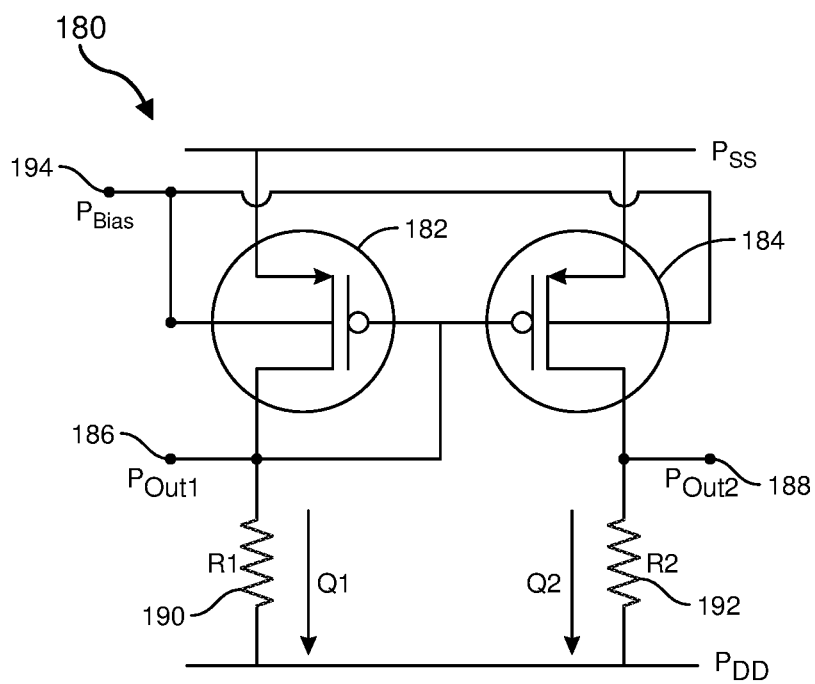

FIG. 3B shows a fluidic circuit 180 configured as a flow mirror having a bias pressure control 194. The fluidic circuit includes first and second fluidic devices 180 and 182, with respective sources connected to source pressure $P_{SS}$, and drains connected to drain pressure $P_{DD}$ through respective first and second flow restrictors 190 and 192. The bias pressure $P_{BIAS}$ applied to the bias control 194 controls the net amount of flow passing through the fluidic circuit, and therefore the central pressures of the first and second output pressures ($P_{Out1}$ and $P_{Out2}$ at 186 and 188 respectively). This example fluidic circuit 180 may be configured as a normally-closed valve flow mirror having a bias pressure that controls the net amount of current passing through the circuit, and therefore the central pressures of the output pressure ranges for $P_{Out1}$ and $P_{Out2}$.

Figure 4:
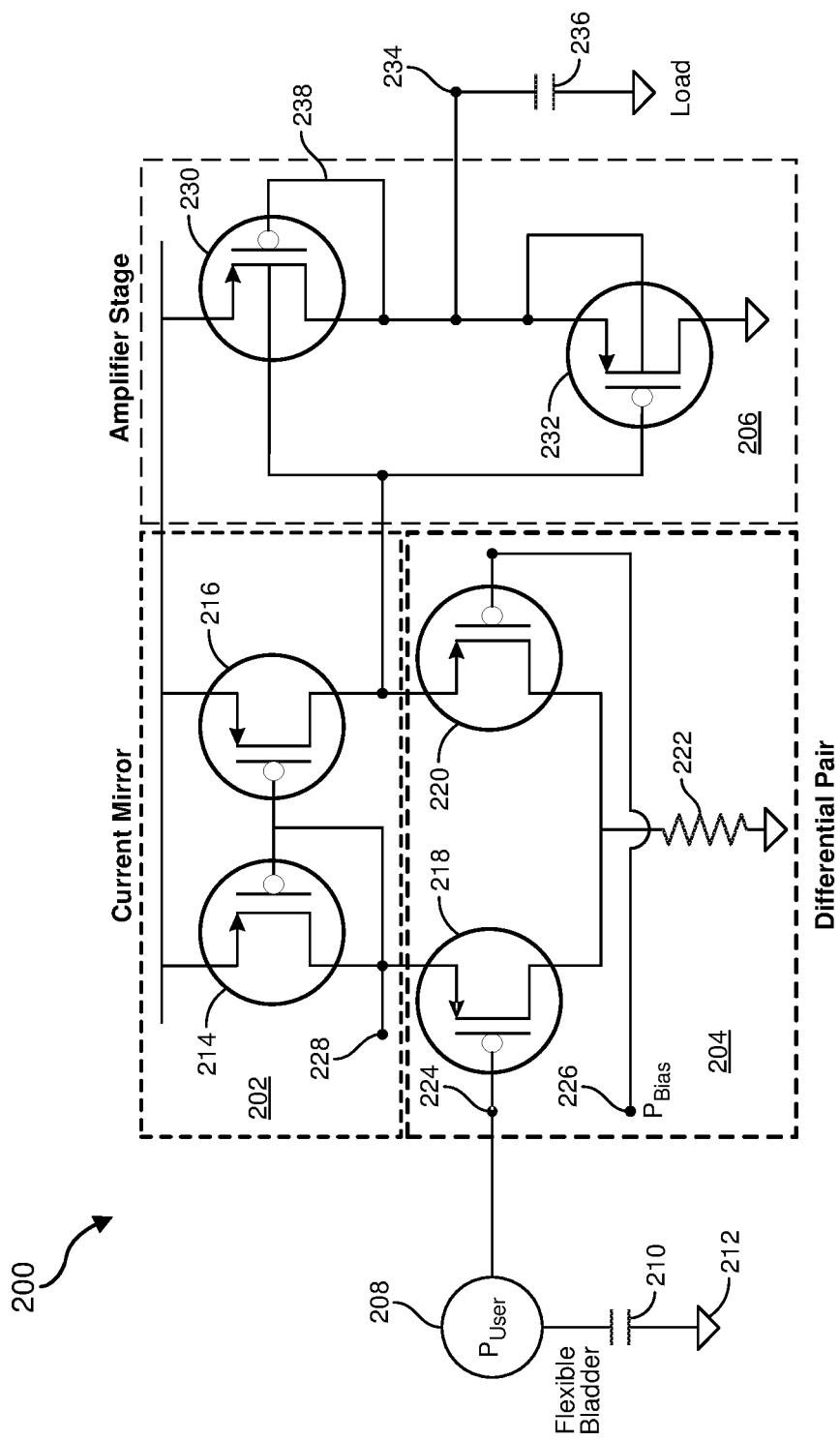
FIG. 4 is a schematic of a fluidic amplifier in accordance with some embodiments.

FIG. 4 shows a fluidic device 200. The device includes a fluidic circuit that receives a user input pressure $P_{user}$ 208. For example, this may be generated by a flexible bladder (e.g., under deformation) which in this example is connected to fluidic ground 212 through a fluidic storage device 210. The fluidic device 200 includes a flow mirror (which may also be termed a current mirror) 202, a differential pair 204, and an amplifier stage 206. The device fluidic output pressure is output at output connection 234 to a fluidic load 236, which may also be connected to a fluidic ground. The flow mirror 202 includes a pair of fluidic valves 214 and 216, and is configured in a manner similar to that discussed above in relation to FIGS. 2A and 3B. The differential pair 204 includes fluidic valves 218 and 220, and is configured in a manner similar to FIGS. 1A and 2B. The bias pressure $P_{Bias}$ at 226 can be used to adjust the pressure levels at the output of fluidic differential pair, which is near the source of fluidic valve 220. In other examples, output 226 may also be used as an output of the differential pair. The output of the fluidic differential pair is received by the amplifier stage 206. In this example, the amplifier stage 206 is a buffer amplifier having two fluidic valves (230 and 232), which may reduce the leakage flow rate. The output of the amplifier stage at 234 is connected to a fluidic load 236.

FIGS. 5A-5E illustrate various example fluidic amplifiers, which may in some examples be used as fluidic buffer amplifiers. In some example fluidic buffer amplifiers, the output pressure may be approximately the same as the input pressure, but the output flow rate may be greater than the input flow rate. Fluidic buffer amplifiers may be used as flow rate amplifiers. In some examples, the output flow rate may be at least approximately double the input flow rate. A fluidic buffer amplifier may be provided using one or more normally open and/or normally closed fluidic valves, or in some examples by a complementary fluidic valve, for example, having with the same area between G+ and G− gates (see further discussion below in relation to FIG. 8).

Figure 5A:
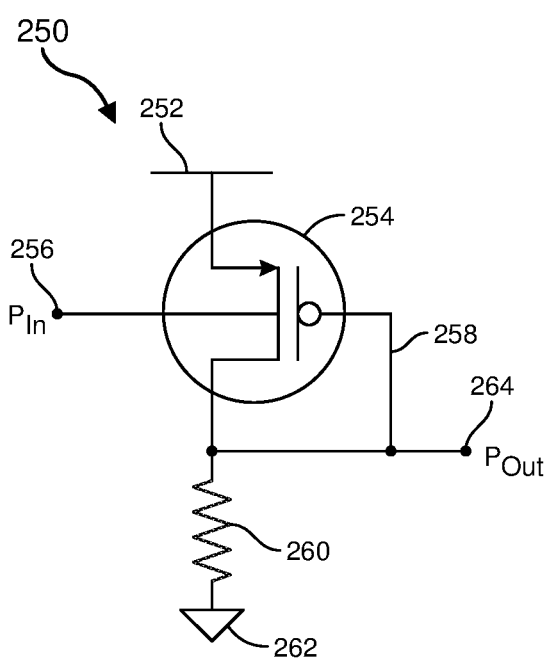
FIGS. 5A-5E are schematics of fluidic amplifiers in accordance with some embodiments.

FIG. 5A shows a unity gain drain follower 250, using fluidic valve 254. The source of the fluidic valve is connected to source pressure at 252, and the drain is connected to fluidic ground 262 through fluid resistor 260. The input pressure is received at input 256 and the output pressure is obtained at the drain at outlet 264. In the drain follower configuration, the gate is connected to the drain, in this example using fluid channel 258.

Figure 5B:
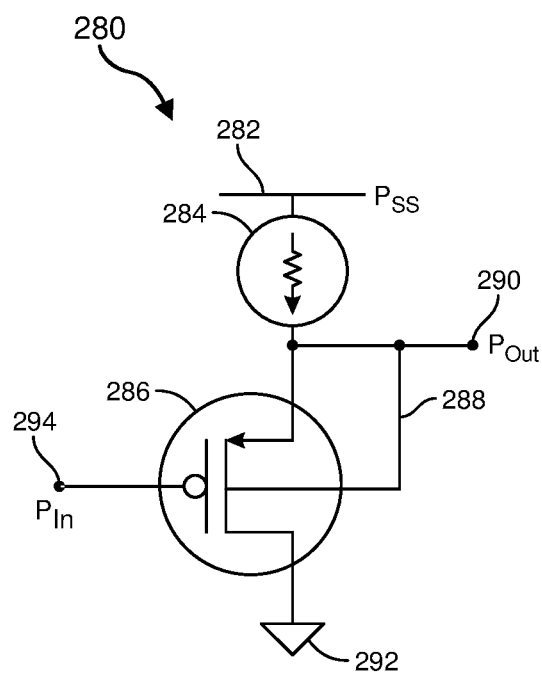

FIG. 5B shows a unity gain source follower 280. The input pressure is received at the gate of the fluidic valve 286. The source is connected to source pressure at 282 through a flow control 284. The output pressure $P_{Out}$ is obtained from near the source of the fluidic valve at 290. The drain is connected to fluidic ground at 292. In the source follower, the source is connected to an interstitial connection through fluid channel 288. Interstitial connections are discussed further below.

Figure 5C:
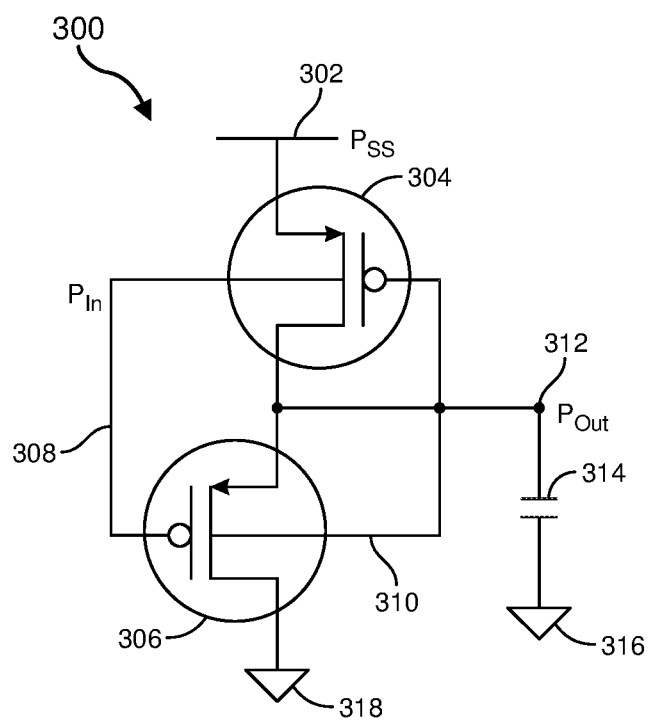

FIG. 5C is a unity gain fluidic amplifier 300 using two fluidic valves 304 and 306. By analogy to electronic amplifiers, this may be termed a Class B fluidic amplifier. The source of the first fluidic valve 304 is connected to source pressure $P_{SS}$ at 302. The drain of the first fluidic valve 304 is connected to the source of the second fluidic valve 206. The drain of the second fluidic valve 306 is connected to fluidic ground at 318. The input pressure is received by the interstitial connection of the first fluidic valve 304 and the gate of the second fluidic valve 306, which are fluidically interconnected. The gate of the first fluidic valve is fluidically connected to the interstitial connection of the second fluidic valve. The output pressure is obtained from the first drain/second source at 312. The output is shown connected through fluidic load 314 to fluidic ground 316.

In example fluidic buffer amplifiers, there may be an amplification factor $\mu=1$ between the gate transmission element region (body) and the gate. Therefore, feedback between the source or the drain and the base may use the pressure balance between the gate pressure and the body pressure ($P_G = P_B$). For example, for a drain follower fluidic circuit, a higher input may increase the opening force on the membrane, allowing more pressure from $P_{SS}$ to move from the source to the drain, increasing the pressure $P_D$ until $P_G = P_B$. The same effect may occur in reverse for the source follower. When combined, the two followers may serve as the "fluid resistor" for the other. However, because the resistance may be dynamic, unity-gain amplification may occur at lower waste currents.

Figure 5D:
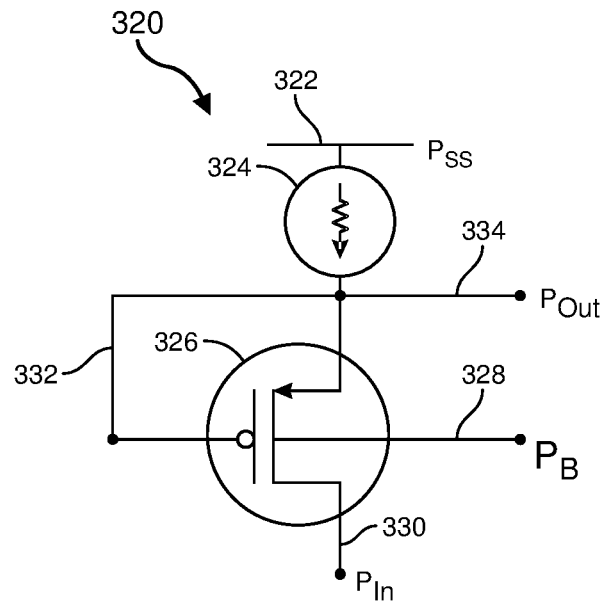

FIG. 5D shows a common body amplifier 320, including fluidic valve 326. The source of fluidic valve 326 is connected through flow control 324 to source pressure $P_{SS}$ at 322. In this configuration, the input pressure $P_{In}$ is received at input 330 near the drain of fluidic device 326. The output pressure $P_{Out}$ is obtained from near the source of the fluidic valve 326, at output 334. In this configuration, the gate and source of the fluidic valve are connected, for example, through fluid channel 332. The body connection 328, if available, the body connection may be used for biasing the device.

Figure 5E:
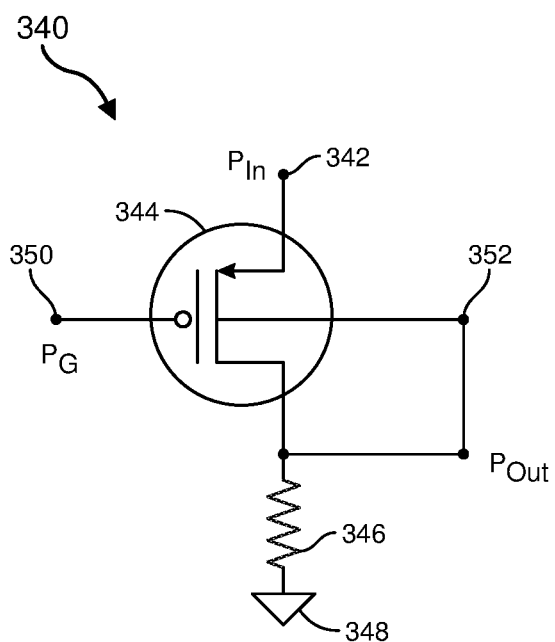

FIG. 5E shows a common gate amplifier 340, including fluidic valve 344. The input pressure is received at inlet 342 near the source of the fluidic valve. The body connection is connected to the drain, and the output pressure is obtained within this connection at outlet 352. The gate pressure can be used to bias the fluidic valve.

In an example common source amplifier, $P_B$ may be set to approximately the center point of the desired output pressure ($P_{Out}$) range. For $P_G = P_B$, the gate is in an approximately neutral position. When $P_{IN} = P_D$ is increased, $P_S$ is increased correspondingly, driving an increase in $P_G$, which is then higher than $P_B$, causing the valve to close. This in turn causes an increase in $P_S$. The feedback loop may therefore drive a pressure gain from $P_D$ to $P_S$. A common gate circuit may only amplify when device is out of a choked regime (in which $P_{In}$ has a small effect on the fluidic valve opening. Example fluidic circuits are potentially useful for impedance matching. Example fluidic circuits are non-inverting amplifiers. However, the behavior of half-current-source resistors may make biasing for current buffering difficult.

Figure 6A:
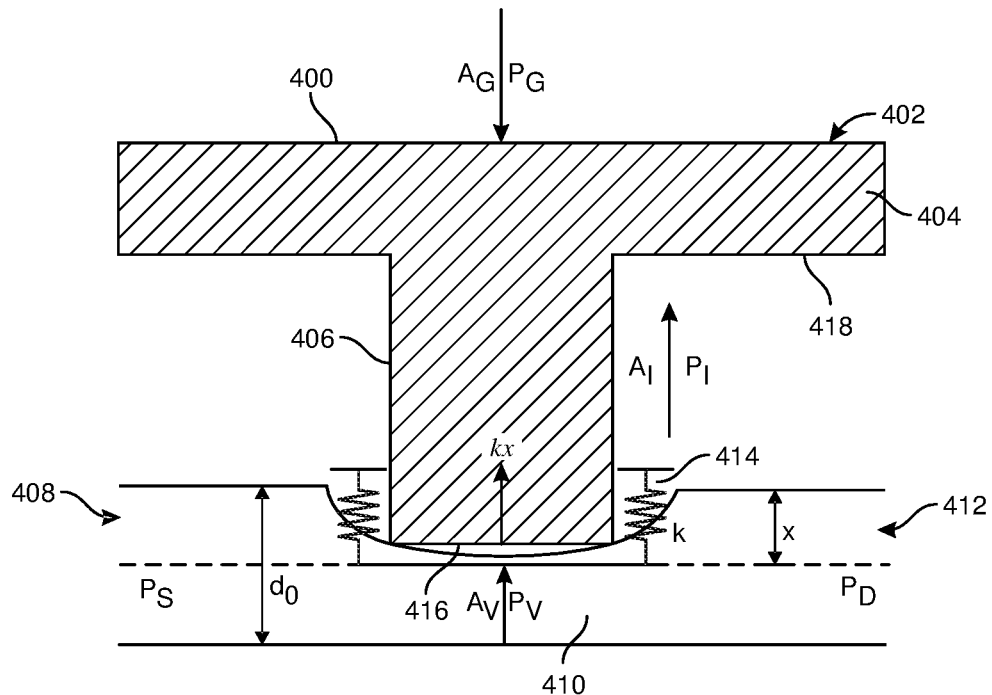
FIGS. 6A-6E depict a relative area fluidic valve in accordance with some embodiments.

FIG. 6A shows a fluidic valve having a relative area valve configuration. The gate transmission element (which may also be termed a valve element) 400 has a gate portion 404 having a top surface 400 and a gate portion underside 418, and a valve portion 406 having a valve portion underside 416. The valve element receives gate pressure $P_G$ over gate area $A_G$. The gate area is the area of gate portion top surface 400. The gate force, the product of gate pressure and gate area, urges the valve element 400 in a downwards direction (as shown in the orientation of FIG. 6A). The gate pressure may tend to close the flow channel 410 between the source 408 and drain 412. The source pressure $P_S$ is greater than the drain pressure $P_D$. The valve pressure $P_V$ acts over the area $A_V$ of valve surface 416, and may tend to resist the gate pressure. In some fluidic valve configurations, an interstitial pressure $P_I$ may also act against the gate pressure over an area $A_I$ on the underside of the valve element 400. There may also be an effective spring constant k as illustrated at, for example, 414, which represents effects such as the resistance of the walls of flow channel 410 to deformation, which may give rise to a spring force. The spring force may be generally proportional to a valve displacement (x) from an open position.

In some examples, FIG. 6A may be a cross-section of a valve element with a disk-shaped gate portion and cylindrical shaped valve portion. Other geometric configurations may be used, such as cuboid, oval, or other shapes.

The valve pressure may be determined as the mean of the source and drain pressure:

$$P_V = (P_S + P_D)/2 \qquad \text{(Equation 1)}$$

The downwards force may be determined as:

$$F = A_G P_G - A_V P_V - A_E P_E - kx \qquad \text{(Equation 2)}$$

The displacement (x) of the valve portion downwards is determined by:

$$x = (A_G P_G - A_V P_V)/k \qquad \text{(Equation 3)}$$

Figure 6B:
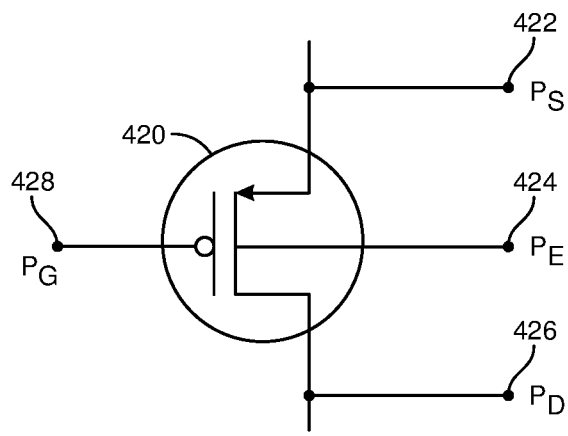

FIG. 6B is a symbolic representation of a fluidic valve, with source connection 422 having source pressure $P_S$, drain connection 426 having drain pressure $P_D$, and gate connection 428 having gate pressure $P_G$. These are the terminals of example three-terminal fluidic valves used in example fluidic circuits described herein. In some examples, a fluidic valve may have an additional interstitial connection 424 with interstitial pressure $P_I$. The symbolic representation of FIG. 6B may be considered analogous to an electronic MOSFET symbol, with the interstitial connection 424 corresponding, in some aspects, to the MOSFET body terminal.

Figure 6C:
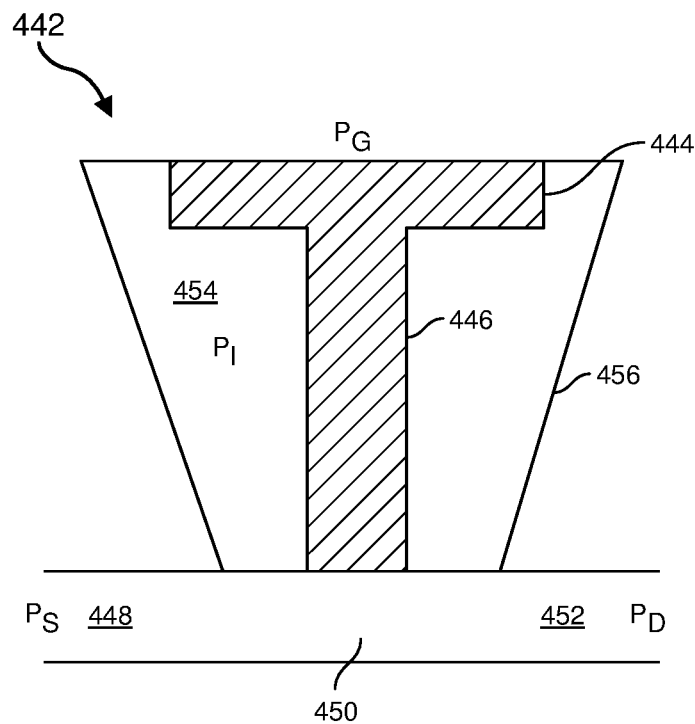

FIG. 6C shows a fluidic valve 442 with an enclosure 456 around the valve element 446. The valve element 446 had a relatively enlarged gate area subject to gate pressure $P_G$ due to gate portion 444. The enclosed gas 454 is at an interstitial pressure $P_I$. The valve is shown in a fully open configuration, so there is no restriction of the valve flow channel 450 between the source 448 and drain 452.

Figure 6D:
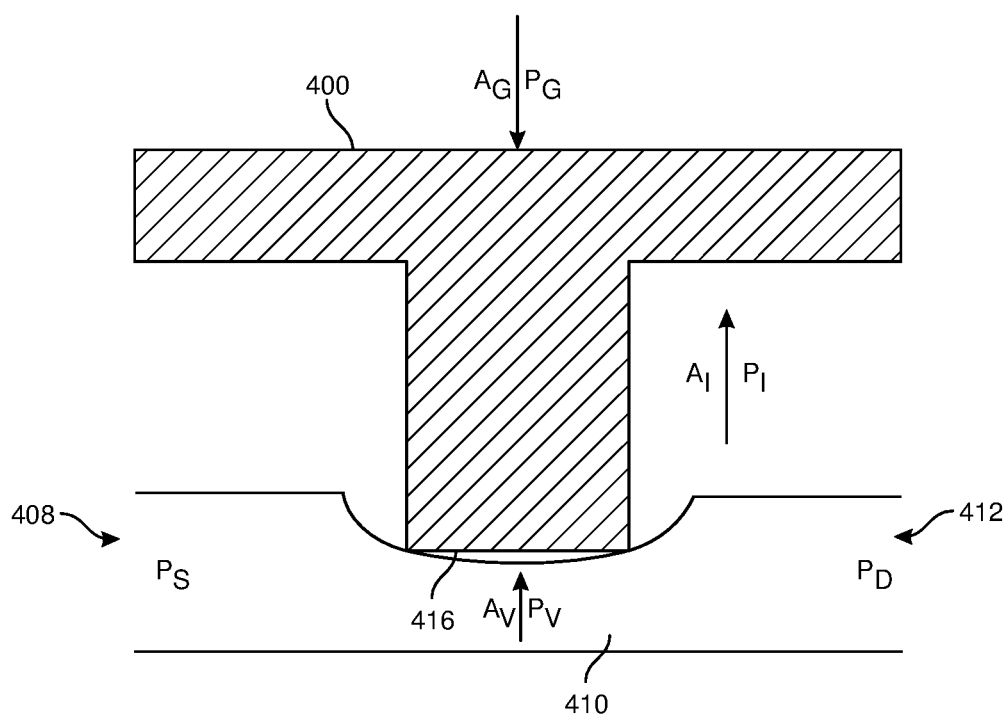

FIG. 6D is a slightly simplified version of FIG. 6A with similar element numbers, further illustrating the pressure-to-pressure gain mechanism. The figure shows gate pressure P acting over the area $A_G$ of the gate portion of the valve 400, which may be opposed by the valve pressure $P_V$ acting over the area $A_V$ of the underside 416 of the valve portion, and further opposed by the interstitial pressure $P_I$ acting over the area $A_I$ of the underside of the gate portion. Fluid flows from the source pressure $P_S$ at source 408, though a valve channel 410, to the drain pressure $P_D$ at drain 412. As the gate pressure $P_G$ is increased, the valve may tend to close. An increase of the interstitial pressure $P_E$ and/or the source pressure $P_S$ may tend to open the valve.

Figure 6E:
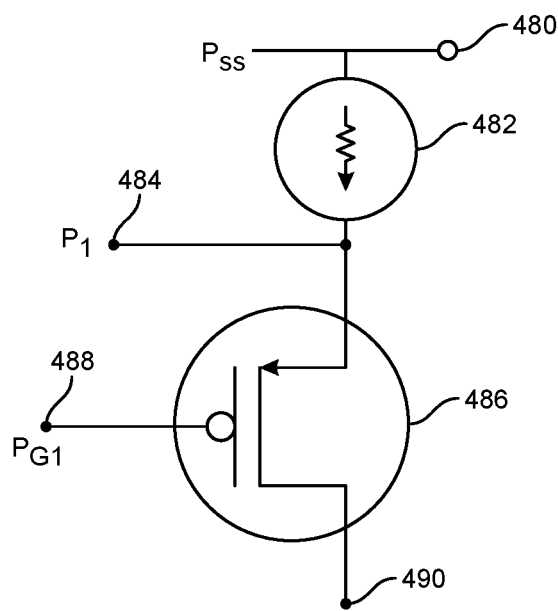

FIG. 6E is a schematic of a fluidic valve amplifier, which is similar to, for example, a portion of the differential pair circuit discussed in relation to FIG. 1A, and which may use the fluidic valve illustrated in FIG. 6D. The fluidic amplifier circuit includes source pressure $P_{SS}$ at 480, a flow controller 482, a fluidic device 486 having a source at pressure $P_1$ (at 484) a gate at pressure $P_{G1}$ (at 488) and a drain at drain pressure $P_D$ (at 490). As gate pressure P increases, the fluidic valve 486 may tend to close and pressure $P_1$ may increase for a particular flow rate (which may be controlled by flow controller 482).

FIG. 6E shows the input pressure $P_{SS}$ connected to the normally-open fluidic valve 486 through a flow controller 482, which may be a high-impedance source such as a flow resistor or a controlled flow source. In this configuration, $P_1$ may be lower than $P_{SS}$ due to the pressure drop across the flow controller. In a normally open fluidic valve the gate pressure applied against the gate area may be opposed by a valve pressure $P_V$, which is intermediate between $P_1$ and the outlet pressure. However, the valve area may be much smaller than the gate area. As the gate pressure $P_G$ is increased, the orifice of the valve seat may decrease in size, causing an increase in impedance through the circuit and a corresponding increase in $P_1$. The increased $P_1$ may then cause an increase in the upward pressure on the valve seat. Valve equilibrium may be restored when the force against the gate (the product of gate pressure and gate area) is balanced by the force against the valve (the product of valve pressure and valve area), with some losses due to mechanical strains and spring/membrane compression. The restoration of gate transmission element equilibrium may involve a much larger increase in $P_V$ to match the small change in $P_G$, due to the gate area being much larger than the valve area.

Due to a railing effect, the gate pressure may have a smaller dynamic range than the source pressure. However, the center-point of this dynamic range can be controlled by altering the interstitial pressure, as further discussed below. The center-point can also be controlled in normally-closed valves by applying pressure to the upward-force gate.

Figure 7A:
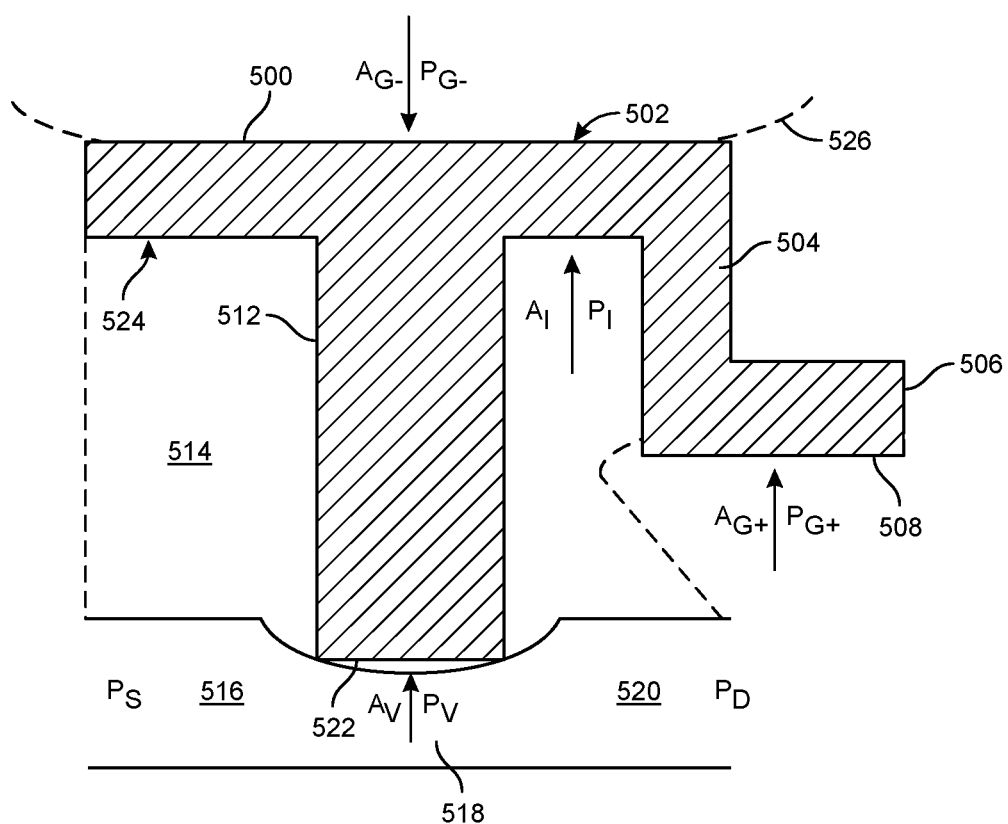
FIGS. 7A-7B depict a fluidic valve in accordance with some embodiments.

FIG. 7A shows another fluidic valve configuration which may be used in some examples. In this example, the valve element includes a first gate portion with top surface 502, a second gate portion with lower surface 508, and a valve portion 512 with lower surface 522. The first gate pressure $P_{G-}$ acts over the surface area $A_{G-}$ of the first gate portion, and is opposed by the second gate pressure $P_{G+}$ acting over the surface area $A_{G+}$ of lower surface 508. In this example, both gate pressures are applied to surfaces outside of the enclosed interstitial volume 514. Various dashed line portions (such as dashed line 526) visually suggest possible enclosure of region above the first gate portion, and possible enclosure of the interstitial volume 514. The first gate pressure $P_{G-}$ is also opposed by the valve pressure $P_V$ applied over the area $A_V$ of the lower surface 522 of the valve portion and also by the interstitial pressure $P_I$ applied over an area $A_I$ of the lower surface 524 of the first gate portion. The first gate pressure acts to close the flow channel 518 between the source 516 (at source pressure $P_S$) and the drain 520 (at drain pressure $P_D$).

Figure 7B:
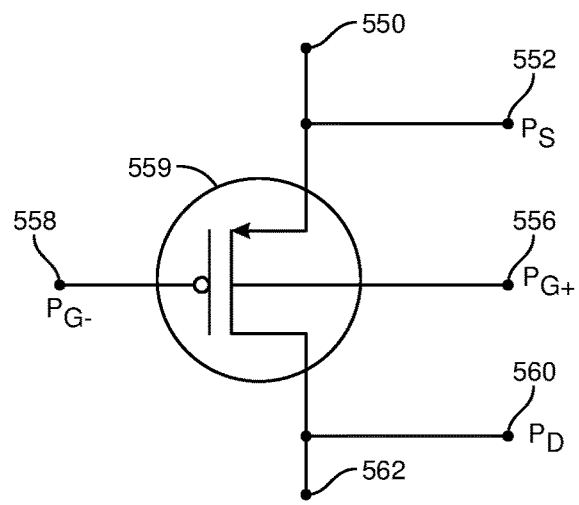

FIG. 7B is a symbolic representation of a four-terminal fluidic valve 559 with a source at source pressure $P_S$ (connections at 550 and 552), a first gate at the first gate pressure $P_{G-}$ (connection at 558), a second gate at the second gate pressure $P_{G+}$ (connection at 556), and drain at drain pressure $P_D$ (connections at 560 and 562).

In some examples, a five-terminal fluidic valve may have a source, a first gate, a second gate, an interstitial connection (e.g., as discussed above in relation to FIG. 6B), and a drain.

Figure 8:
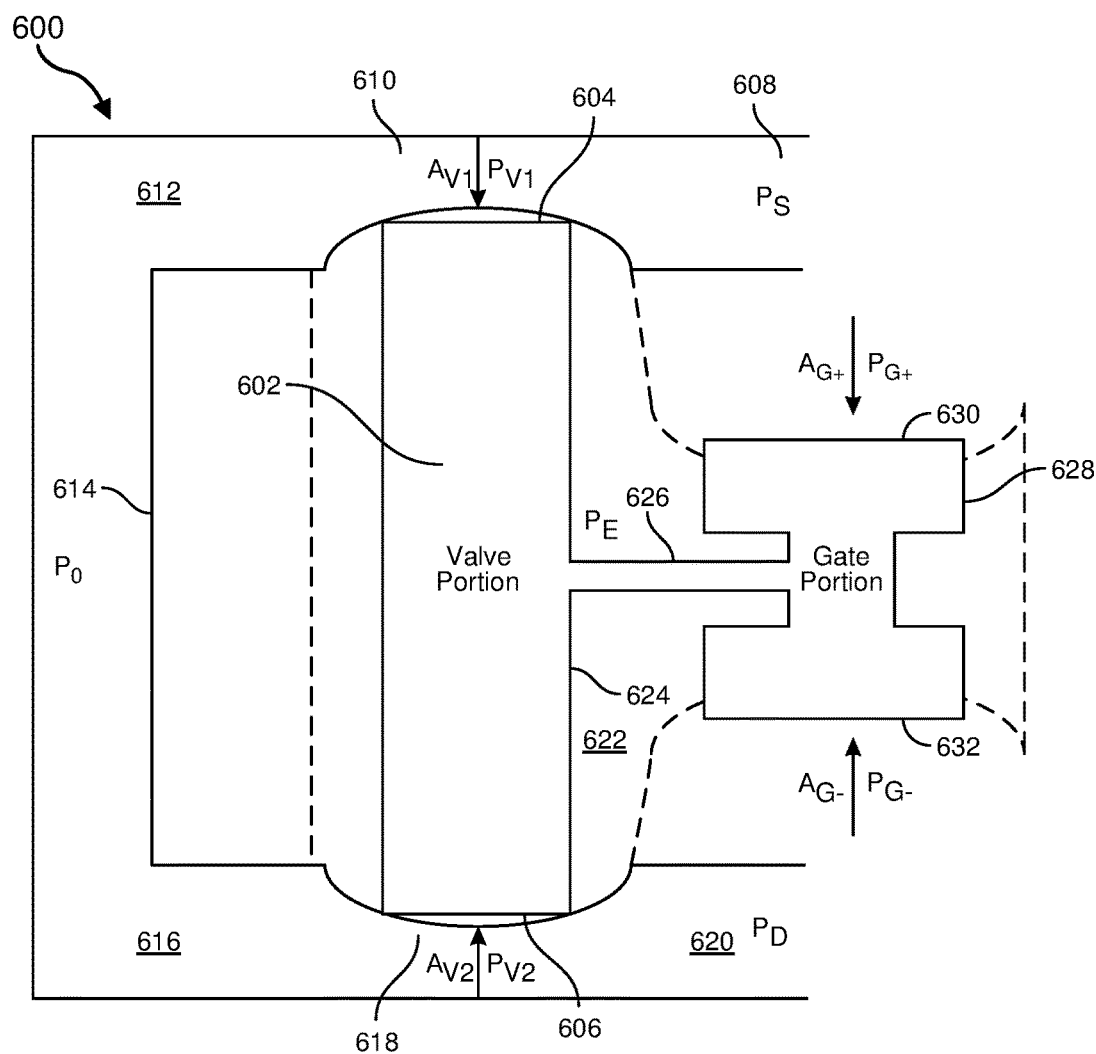
FIG. 8 depicts a fluidic valve in accordance with some embodiments.

FIG. 8 shows another example fluidic valve that may be used in some examples. The fluidic valve 600 includes source 608 (at source pressure $P_S$), first valve channel 610 at first valve channel pressure $P_{V1}$ acting over area $A_{V1}$, intermediate channel with upper portion 612 and lower portion 616, second valve channel 618 at second valve channel pressure $P_{V2}$ acting over $A_{V2}$, and drain 620 (at drain pressure $P_D$). A valve element includes a gate portion with first surface 630 and second surface 632, a valve portion 602 with upper and lower valve portion surfaces 604 and 606, and a connecting portion 626. An enclosed interstitial region 622 may have an interstitial pressure $P_I$, which may be independently controlled.

A device fluidic output can be obtained in the intermediate channel 612, for example, by using an outlet within intermediate channel wall 614. This output pressure is denoted $P_O$ and may be determined by a balance of forces on the gate portion. For example, as the first gate pressure $P_{G+}$ increases (and/or as the second gate pressure $P_{G-}$ falls), then the first valve channel may be expanded, the second valve channel may be constricted, and $P_O$ may increase and approach $P_S$. As the second gate pressure $P_{G+}$ increases (and/or as the first gate pressure $P_{G-}$ falls), then the first valve channel may be constricted, the second valve channel may be expanded, and $P_O$ may fall and approach $P_D$. There may be a balanced configuration in which $P_O$ is the mean value of $P_S$ and $P_D$. In the illustrated example, the first valve channel pressure may act against the second gate pressure and the second valve channel pressure. Similarly, the second valve channel pressure may act against the first gate pressure and first valve channel pressure. Dashed lines visually suggest possible enclosures, such as enclosure of an interstitial region, though the location of actual enclosures is not limited by the location of the dashed lines.

A fluidic valve represented by FIG. 8 may be termed a complementary fluidic valve. In this example, $P_S$ is greater than $P_D$. If the magnitude of pressures and the flow directions are reversed, then P+ and P− may reverse. In this example, the positive (+) and negative (−) symbols are used to indicate the direction of the expected change to $P_O$ as that pressure is increased. In this example, these symbols are not used to indicate positive or negative pressure. $P_O$ may tend to increase as $P_{G+}$ is increased, and $P_O$ may tend to decrease as $P_{G-}$ is increased. Interior interstitial pressure may be controlled independently of the other pressures. The two gate pressure sources (for $P_{G+}$ and $P_{G-}$) may be substantially isolated from each other and also isolated from the interstitial pressure ($P_I$) and from the channels. Embodiments of this disclosure include any suitable modification to these example designs.

Figure 9:
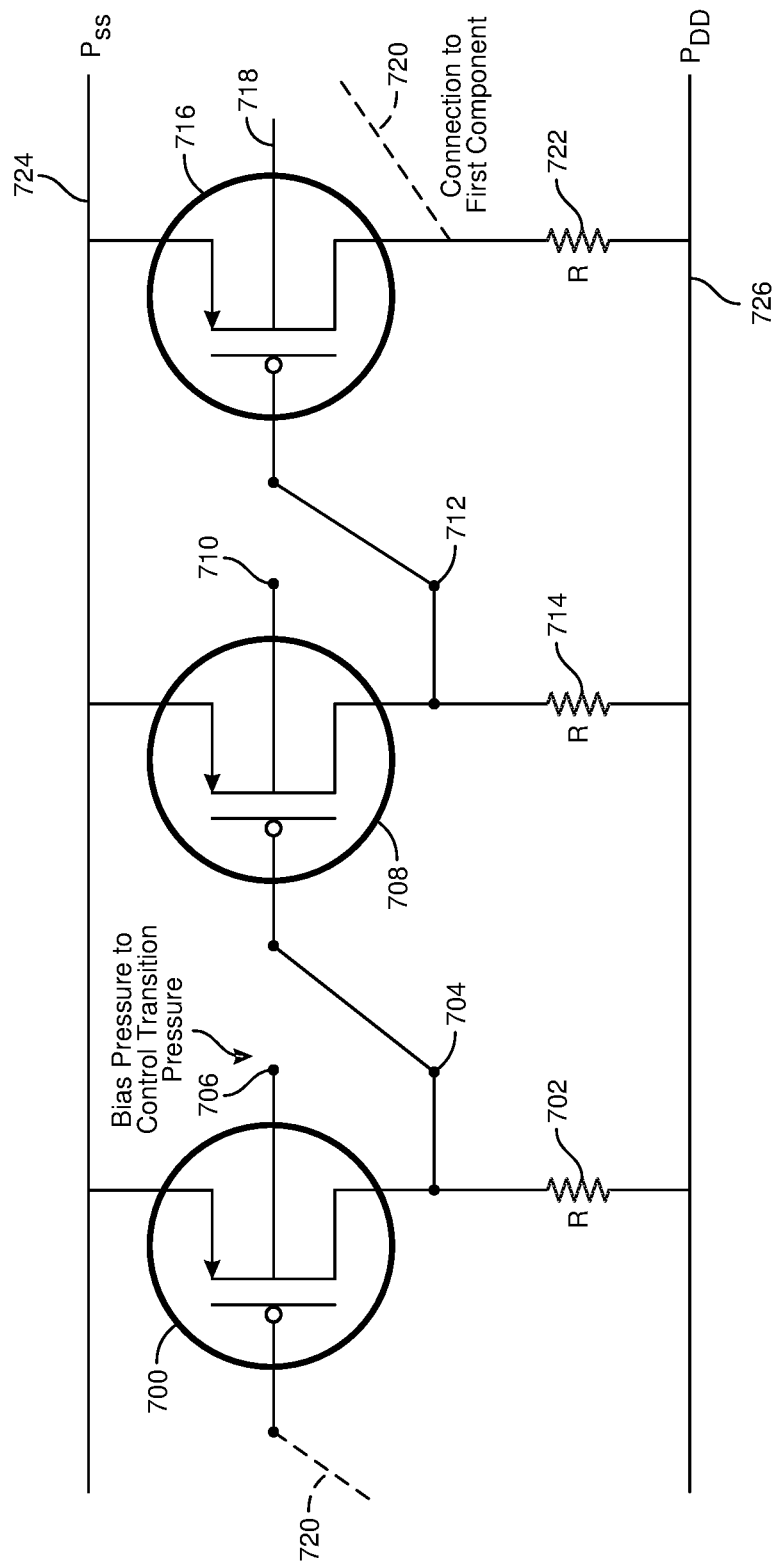
FIG. 9 is a schematic of a fluidic ring oscillator in accordance with some embodiments.

FIG. 9 shows an example ring oscillator using first, second, and third fluidic valves 700, 708, and 716, respectively. Each fluidic valve has a source connected to source pressure $P_{SS}$, and a drain connected to drain pressure (e.g., at 726) through first, second, and third flow restrictors 702, 714, and 722 respectively. Bias pressures at 706, 710, and 718 can be used to adjust transition pressures. In this configuration, the drain of the first fluidic valve 700 is connected to the gate of the second fluidic valve 708 (through connection 704), the drain of the second fluidic valve is connected to gate of the third fluidic valve 716 (through connection 712), and the drain of the third fluidic valve is connected to the gate of the first fluidic valve. This connection is not shown in its entirety, but includes the fluid connection 720 which interconnects the drain of the third fluidic valve 716 to the gate of the first fluidic valve 700. The feedback causes fluidic oscillation in the fluidic ring oscillator circuit. An oscillatory output pressure may be obtained at the drain of any fluidic valve, such as at the drain of the third fluidic valve. The oscillatory fluidic output may be further amplified using a fluidic amplifier, such as described elsewhere herein. An oscillatory fluidic output (amplified or not amplified) may be applied to a haptic device to provide haptic feedback to a person. In some examples, a fluidic oscillator may be used as a clock, for example, in a fluidic digital circuit.

In an example fluidic ring oscillator circuit, an output of one fluidic valve (such as the source pressure) may be connected to the gate of the subsequent fluidic valve. The signal may invert through each fluidic valve, and so oscillation may be obtained when an odd number of fluidic valves is used. Fluidic valves may change states rapidly from on to off. The oscillation frequency may be determined by, for example, the magnitude of the drain flow resistances denoted R (702, 714, and 722), the internal capacitances (e.g., dead volumes) of fluidic valves, the rail pressures (source pressure $P_{SS}$ and drain pressure $P_{DD}$), and the bias pressure $P_E$ that controls the pressure at which the fluidic valves change states from on to off. A ring oscillator may also be implemented using normally-closed fluidic valves, in which case the device output may be on the relatively high-pressure side of a fluidic valve, for example, provided by a fluid connection near the source. A ring oscillator may also be implemented using one or more complementary logic fluidic valves.

A fluidic amplifier may be configured as a fluidic oscillator by provision of positive feedback from the device fluidic output to the fluidic input. Positive feedback may include, for example, directing a portion of a fluidic output pressure to a gate of an input fluidic valve, the pressure tending to increase the magnitude of the output pressure. In some examples, negative feedback may be provided from the output of a fluidic amplifier to the input. This may have a stabilizing effect on the fluidic amplifier.

Figure 10A:
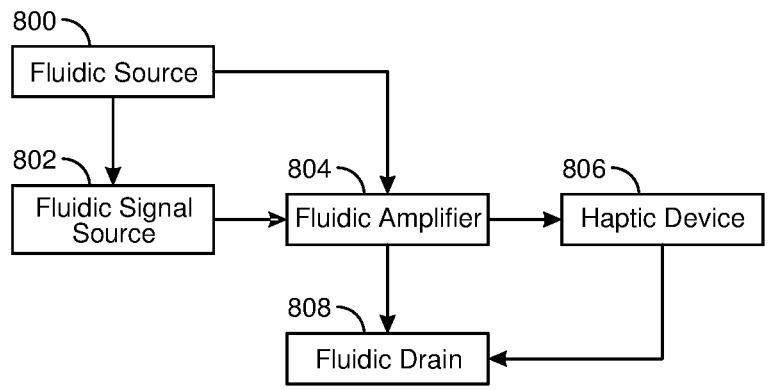
FIGS. 10A-10C depict fluidic systems in accordance with some embodiments.

FIG. 10A shows a block diagram of an example fluidic device, including a fluidic source 800 supplying fluidic pressure to a fluidic signal source 802 and a fluidic amplifier 804. The fluidic amplifier supplies a device fluidic output to a fluidic load, in this example a haptic device 806. The fluidic amplifier and haptic device are connected to a fluidic drain 808.

Figure 10B:
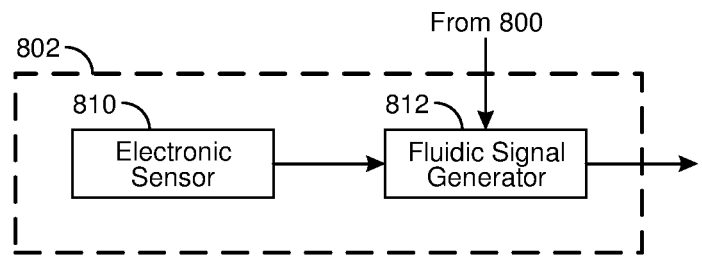

FIG. 10B shows an example configuration of a fluidic signal source 802 in which an electronic sensor 810 electrically modulates an output of a fluidic signal generator 812, hence providing a fluidic signal source. The output of the fluidic signal generator may be provided as a fluidic input, for example, to the input of a fluidic amplifier (e.g., the fluidic amplifier 804 as shown in FIG. 10A).

Figure 10C:
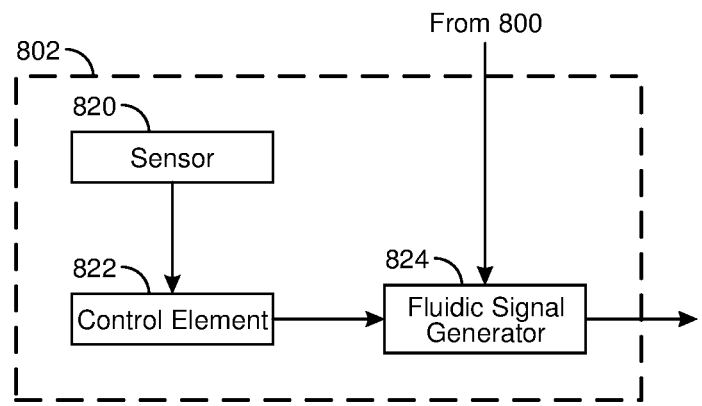

FIG. 10C shows another example configuration of a fluidic signal source 802 in which a sensor 820 provides data to a controller 822, which then electrically controls a fluidic signal generator 824 to provide a fluidic signal to a fluidic amplifier (e.g., fluidic amplifier 804 as shown in FIG. 10A). The controller 822 may receive sensor signals from a plurality of sensors.

Figure 11:
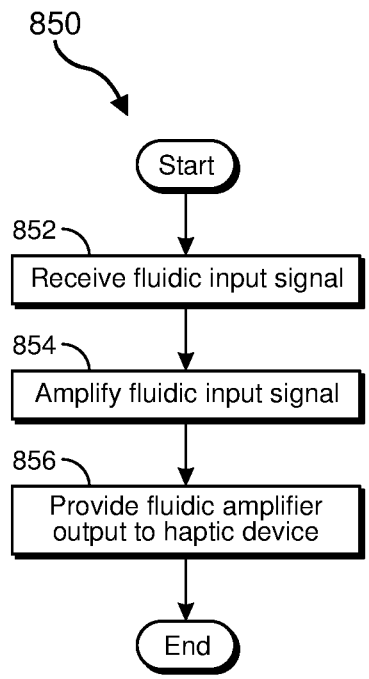
FIG. 11 depicts a method in accordance with some embodiments.

FIG. 11 shows a flow chart of an example method 850, including receiving, at a fluidic amplifier, a fluidic input signal (852), amplifying, by the fluidic amplifier, the fluidic input signal, for example, to provide a device fluidic output (854), and providing the device fluidic output to a fluidic load, such as a haptic device (856).

Figure 12:
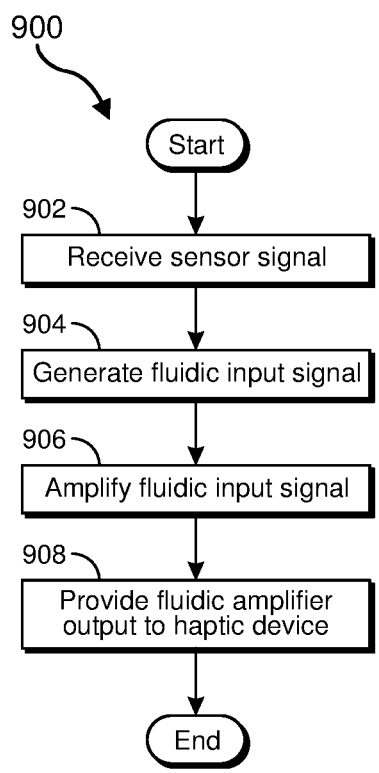
FIG. 12 depicts a method in accordance with some embodiments.

FIG. 12 shows a flow chart of an example method 900, including receiving a sensor signal, which may be an electrical sensor signal (902), generating a fluidic input signal (e.g., in response to the received sensor signal (904)), amplifying the fluidic input signal (e.g., by a fluidic amplifier (906)), and providing the device fluidic output to a fluidic load, in this example a haptic device (908).

Figure 13:
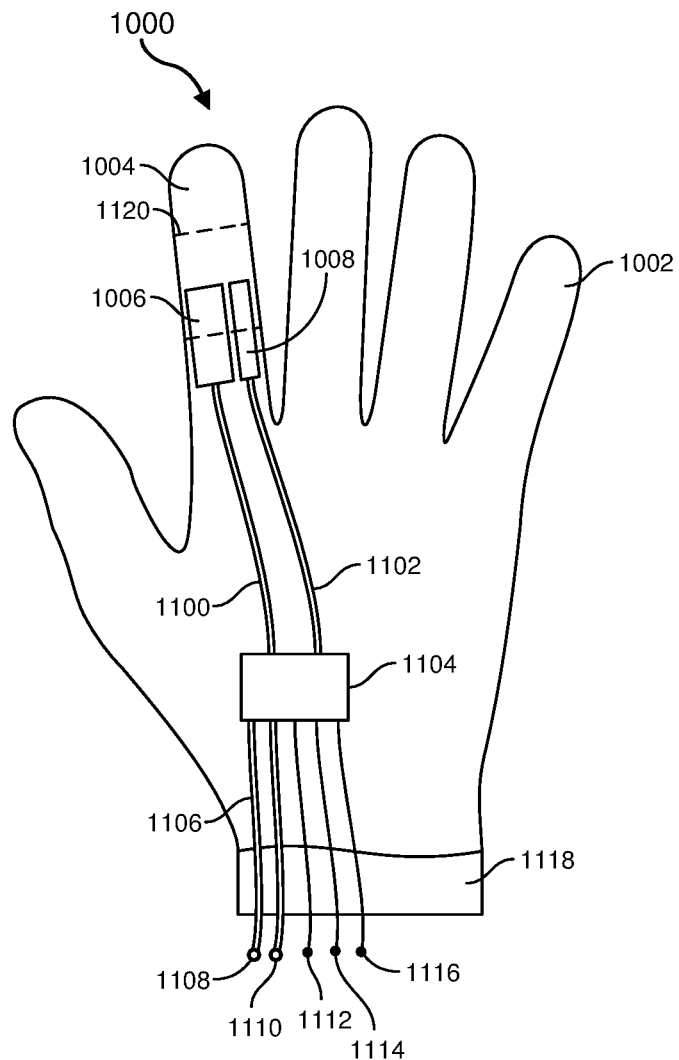
FIG. 13 depicts a haptic glove in accordance with some embodiments.

FIG. 13 shows an example haptic device. In this example a glove 1000 includes a haptic transducer 1006 and a sensor 1008 located on a finger 1004 of glove 1000, in this case near a finger joint (as represented by a dashed line such as 1120). The haptic device is fluidically connected via fluid channel 1100 to a controller 1104. The sensor is electrically connected via cable 1008 to the controller 1104. The controller may receive pressurized fluid at source pressure through source fluid channel 1106 having source connection 1108. Similarly, the controller may return fluid through a drain fluid channel having a drain connection 1110. The controller may also receive electrical power through power connections 1112 and 1116 and may send and receive electrical signals through signal connection 1114. The glove has a wrist cuff 1118 and additional fingers, such as little finger 1002.

FIG. 13 shows an arrangement that may be located on the front and/or back of a hand. Sensors and/or haptic transducers may be located at one or more joints of one or more fingers (and in this context, the general term "finger" includes the thumb). The figure shows a glove 1000, with finger portions 1004 having creases such as 1120 near joints. One or more finger portions (such as 1004) may support a haptic device 1006 and a sensor 1008. The sensor may be used to determine finger joint bend angle. The haptic device may provide haptic feedback to a user. The sensor 1008 has an electrical connection to a control unit 1104. The haptic device 1006 has flow channel connections (1100 and 1102) to the control unit 1104. The control unit may have electrical connections (e.g., through electrical connectors 1112, 1114, and 1116, which may provide, for example, a supply voltage, a data connection, and ground). Other electrical connectors may be provided as needed. The control unit may also include fluidic source inlet port 1108 and fluidic drain outlet port 1110, connected, for example, through tubing or other form of flow channel such as 1106. Wrist band 1118 may also include sensors and/or haptic devices as desired. A glove or other such wearable device may have electrical and/or fluidic connectors, for example, to which a cable including electrical conductors and/or flow channels may be attached.

Figure 14:
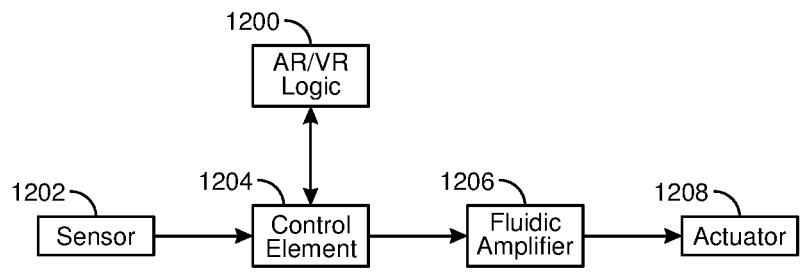
FIG. 14 is a schematic of a system in accordance with some embodiments.

FIG. 14 is a schematic of an example system including a sensor 1202 providing a sensor signal to a control element 1204. The control element may exchange data with an AR/VR logic unit 1200. The control unit may provide a fluidic input to a fluidic amplifier 1206, which in turn provides a device fluidic output to a fluidic load, in this example an actuator 1208. The actuator may be a component of a haptic device.

Applications

Analog fluidic circuits may be used in devices such as a variable-stiffness jammer, user force-dependent grounding, and fine control of soft robots, actuators, and the like. Example devices include fluidic amplifiers having an improved or controlled frequency responses, feedback controls, devices providing a conversion of displacement to pressure, or pressure to fluid flow conversion, microfluidic devices, fluidic valves, or other approach.

Examples include analog fluidic circuits, which may convert small changes in input pressure and/or input flow into proportional (or semi-proportional) changes in output pressure and/or flow. Fluidic amplification may include fluidic gain in pressure and/or flow, allowing increased output pressure and/or current changes as a result of input pressure and/or current changes. In some examples, the output of a fluidic device may be connected to a haptic device. In some examples, an actuator may affect an all-ornothing change to a fluidic signal, which may be termed a binary or digital actuator. Semi-continuous signals may be generated by multiple binary actuators working in parallel, but this may involve using a corresponding number of independent controls. Continuous pressure may also be generated through an independent pressure controller; however, in some embodiments these may be bulky and not easily miniaturized. The use of analogue fluidic amplifiers may reduce or substantially eliminates such problems. For example, an analog fluidic signal (such as a dynamically variable flow and/or pressure) may be provided by a fluidic amplifier, which in some cases may include only a single fluidic valve In some examples, fluidic devices may take an input signal including one or more (or a combination of) pressure, flow rate, or mechanical displacement, and generate an output signal of pressure, flow rate, and/or mechanical displacement that is substantially proportional to the input signal. In some examples, this may be achieved using partial actuation of one or more relative area valves, and optionally may be combined with an implementation of pressure-based feedback.

Applications include haptics devices, for example, devices configured to provide tactile feedback, for example, in an augmented reality (AR) or virtual reality (VR) system. In some examples, methods of providing haptic feedback to a user include using a fluidic device (such as described herein) to provide a time-varying pressure signal to the skin of the user. Haptic feedback may include oscillatory or other time-dependent pressure signal, which may in some examples be conveyed to a user by inflation of an enclosure (such as a bladder) or channel (such as an elastic-walled channel) located close to the skin. Example applications may include hydraulic systems, devices, and methods, such as suspensions (e.g., for vehicles, robots, or any mobile object), transmissions (e.g., for engines, actuators, and the like), and hydraulic actuators (including pushers, drills and other rotating items, and the like). Examples include systems, devices, and methods related to general pneumatic control and pneumatic logic applications. In some examples, devices and systems may be configured for chemical engineering processing, for example, through control of fluid flows of one or more chemical species, reagents, solvents, and the like. Examples include large-scale industrial control, and smaller scale applications including microfluidics. Examples include devices for inflating one or more pneumatic devices, which may include large devices such as balloons. Applications include robotic devices and components, including soft robotics devices and components, and include grasping arms and manipulator arms. Examples also include control of microfluidic devices for chemical, biological, and biomedical applications, such as bioassays, cell sorting, and the like. In some examples, a fluidic device may be used for pneumatic control of microfluidics device. Examples also include computational fluidics, including fluidic logic gates and fluidic operational amplifiers. Computational fluidic devices may be used in conditions hostile to conventional electronic components, such as in the presence of ionizing radiation and/or high temperatures. Fluidic valve components and fluids used in a fluidic circuit may have an operational temperature range appropriate to the application and/or operational conditions, which may include temperatures well above or well below typical room temperatures. Fluids may include organic compounds, solvents, molten salts, and the like. Antifreeze-like components may be used for low temperature applications. Inorganic compounds, such as molten salts or molten metals, may be used as the fluid in high temperature applications (e.g., for rocketry, chemical engineering control, reactor control, space applications, and the like).

In some examples, a fluidic valve may include a relative area valve with a pressurized gate transmission element region (which may also be termed an interstitial region). This configuration may add one more terminal to a relative area valve allowing for pressurization of the region between the gate and valve seat. Control of this pressure may allow for control of actuation pressure of normally-closed valves and may enable normally-closed valves to function in a similar manner to normally-open valves.

In some examples, a fluidic circuit includes a relative area fluidic valve with the interstitial region pressurized. This configuration may add one more terminal to a relative area valve and may allow for pressurization of the interstitial region between gate and the valve seat. Control of this pressure may enable control of the actuation pressure of normally-closed fluidic valves and may also enable use of normally-closed fluidic valves as normally-open fluidic valves. In some examples, a relative area fluidic valve may include an innate fluidic feedback and/or may include a high impedance to increase the pressure and/or flow amplification.

In some examples, a device may include a complementary relative area valve circuit, which may include feedback. Feedback may be configured as inverting or non-inverting. In some examples, chained complementary valves may be configured in inverting or non-inverting configurations. In some examples with an inverting chain of fluidic valve stages, the stage outputs may alternate between high and low at the output of each stage. In a non-inverting chain fluidic valves, the output may be the same (high or low) at the output of each stage. In some examples, a complementary relative area valve may be configured as differential amplifier. Additionally or alternatively, a complementary relative area valve may be configured as current mirror. In some examples, a complementary relative area valve may be configured as a positive feedback device and may be used as a pseudo-latch. Furthermore, a complementary relative area valve may be configured as a positive feedback device and may be used as a pseudo-latch.

Example fluidic circuits may include a differential pair with input controls where one output flow (and/or output pressure) increases as the other output flow (and/or output pressure) decreases. In some examples, a device, such as a fluidic amplifier, may include a pair of fluidic valves configured as a fluidic differential amplifier. A fluidic differential amplifier may be configured with or without output flow buffering.

In some examples, a fluidic circuit, such as an analog fluidic amplifier, may include a single-valve fluidic amplifier including only a single fluidic valve. Example fluidic amplifiers may have different amplifier topologies, such as common gain amplifiers or common gate amplifiers.

A fluidic valve may be termed a fluidistor, for example, if it provides fluidic pressure gain and/or flow gain.

In some examples, a buffer amplifier may be used, for example, for signal isolation. In some examples, a fluidic circuit may include a current mirror in which a fluidic flow rate is reproduced in one or more additional fluidic channels.

In some examples, a device, such as a fluidic amplifier, may include a plurality of fluidic valves. A fluidic amplifier may include a differential amplifier. A fluidic amplifier may be configured with or without output flow buffering.

In some examples, a ring oscillator may include three or more complementary fluidic amplifiers linked in a cyclic inverting chain. In some examples, a device may include a fluidic ring oscillator with a frequency control. The frequency control may include an adjustable output flow restrictor. An adjustable flow restrictor may include an adjustable aperture (such as an adjustable area aperture or an aperture selectable from a plurality of apertures having different aperture areas).

In some examples, a flow restrictor, or a high-impedance constant current source, may include an orifice plate, and may be placed upstream of a fluidic valve. A flow restriction upstream of a fluidic circuit may provide a high-impedance pressure input to increase the pressure-to-pressure signal gain (e.g., of a fluidic amplifier including the fluidic valve). In some examples, a flow restrictor may be located downstream of a fluidic valve (e.g., between the drain of the fluidic valve and the drain rail pressure). This may increase the linearity of the input pressure/output flow rate relationship and may provide a method of creating linearly proportional fluidic resistance in the compressible region. In some examples, a single flow restrictor may be placed between a location with variable pressure and a low-pressure location. Provided that the absolute pressure of the low pressure location is lower than approximately half the absolute pressure of the upstream point, the flow restrictor may be driven into a choking regime, where the flow becomes linearly dependent on the upstream pressure. Thus, a single flow restrictor can turn non-linear compressible fluid flow into linear flow/pressure relationship and provide an effectively linear flow resistor. In some examples, two or more orifice plates may be used in series to provide a steady inter-device pressure between a first fluidic valve and a second fluidic valve (e.g., a pressure that is independent of a downstream pressure at the second fluidic valve and dependent only on the upstream pressure). One or more orifice plates may be provided in a method of creating a high-stability pressure source A fluidic valve may also be termed a "fluidistor" based on the term "fluidic transistor," but a fluidic valve may function differently than an electrical transistor counterpart. Many functions described herein may be achieved with different circuit topologies or a different design of the fluidic valves. Fluidic valves include, for example, normally open, normally closed, and complementary relative area fluidic valves. Examples described herein may use compressible fluids or incompressible fluids. In some examples, a fluid may be a liquid. In some examples, a fluid used in a fluidic device may be (or include) an aqueous fluid (such as water, a salt solution, and the like). In some examples, a fluid used in a fluidic device may be (or include) an oil, such as a hydrocarbon. In some examples, a gas (such as air or nitrogen) may be used instead of a liquid fluid. used in a fluidic device and the like. In some examples, a fluid may be a multiple phase and/or non-Newtonian fluid, such as a liquid crystal, thixotropic liquid, emulsion, micellar solution, and the like. In some example, a fluidic input may include a pressure and/or flow of a gas (such as air, nitrogen, and inert gas, steam, or other gas or vapor). In some examples, a fluidic output may include a pressure and/or flow of a gas (such as air, nitrogen, and inert gas, steam, or other gas or vapor).

Fluidic circuits may be constructed using discrete components, such as individual fluidic valves interconnected using fluid channels, such as tubing. An adapter board may be used for connecting pressure sensors to FPGA. For electronic sensors or other circuits, a mains frequency filter (e.g., a 60 Hz filter) may be used to remove electrical noise. In prototyping devices, a housing may connect pressure sensors and/or flow sensors to an amplifier board with a variety of mechanical attachment ports. Sealed connections to the sensors may be made without over-compressing the sensors and the connections may be adapted to reduce dead volume and/or the ability to direct flow into different directions. A fluidic circuit prototype may include a controllable pressure source, a flow sensor, and a pressure sensor in series, and an attachment for connecting a fluidic valve or other component to be evaluated. An optical imaging device, such as a high-speed camera, may be used to correlate fluidic variables with mechanical displacement of a membrane.

In some examples, fluid channels and movable components may be formed by etching system components, such as valve components or seals. In some examples, a fluidic valve may be assembled from individual components. In some examples, a fluidic valve may have a multilayer structure.

An exemplary computer-implemented method for providing a haptic signal may include receiving, by a fluidic differential amplifier, a fluidic input. The fluidic input may be compared to a reference fluidic signal, such as a fluidic bias, and a fluidic difference output may be generated. The fluidic difference output may be based on a difference between a fluidic input and a fluidic bias, for example, a pressure difference between the fluidic input and the fluidic bias. The fluidic difference output may then be provided as a fluidic amplifier input to a fluidic amplifier, such as a fluidic buffer amplifier. The fluidic amplifier may provide appreciable flow amplification of the fluidic amplifier input. One or more method steps may be performed by any suitable computer-executable code and/or computing system. In some examples, one or more method steps may represent an algorithm whose structure includes and/or is represented by multiple sub-steps. In some examples, methods are described for receiving an input signal including a one or more of pressure, flow rate, or mechanical displacement, and generating an output signal including one or more of a pressure, flow rate, or mechanical displacement that is substantially proportional to the input signal. In some examples, this may be achieved using partial actuation of one or more relative area valves, and optionally may be combined with providing pressure-based feedback.

In some examples, a method includes receiving a fluidic input signal, and providing, using a fluidic amplifier, a fluidic output signal correlated with the fluidic input signal. The flow rate and/or pressure of the output signal may be amplified to provide a fluidic output signal. A fluidic output signal may be provided to an actuator and/or a haptic device. A fluidic circuit may include a pair of fluidic valves, and optionally may further include a fluidic flow mirror to balance flows to each of the pair of fluidic devices. In some examples, a method includes amplifying a pressure of a fluidic input using a fluidic amplifier and then amplifying the flow rate of the fluidic input using a fluidic buffer amplifier.

In some examples, a method includes receiving a fluidic input signal, receiving a reference fluidic input signal (e.g., a bias pressure), and providing, using a fluidic difference circuit, a fluidic difference output correlated with a difference between the fluidic input signal and the reference fluidic input signal. The flow rate and/or pressure of the fluidic difference output may be amplified to provide a fluidic output signal. A fluidic output signal may be provided to an actuator and/or a haptic device. A fluidic circuit may include a pair of fluidic valves and optionally may further include a fluidic flow mirror to balance flows to each of the pair of fluidic devices.

In some examples, a computer-implemented method includes controlling a fluidic source to provide a fluidic input signal and then amplifying the fluidic input signal using a fluidic circuit to provide a haptic signal to a person. In some examples, a computer-implemented method includes receiving a sensor signal from a sensor, and in response to the sensor signal, controlling a fluidic source to provide a fluidic input signal to a fluidic circuit. The fluidic amplifier may then amplify the fluidic input signal to provide a haptic signal to a person.

In some examples, a system includes a device, such as a fluidic device as described herein, at least one physical processor, and physical memory including computer-executable instructions that, when executed by the physical processor, cause the physical processor to control a fluidic input signal to a fluidic circuit.

In some examples, a non-transitory computer-readable medium includes one or more computer-executable instructions that, when executed by at least one processor of a computing device, cause the computing device to control a fluidic input signal. The fluidic input signal may be provided to a fluidic circuit which may amplify the fluidic input signal to provide a fluidic output signal to a fluidic load. A fluidic load may include, for example, an actuator and/or haptic device.

In some examples, a computer-implemented method for providing a haptic signal may include electrical control of a fluidic pump, aperture, or other flow restriction (e.g., a valve). In some examples, a system for fluidic provision of haptic feedback may include several modules stored in memory, including a module for controlling a fluidic input signal to a fluidic circuit. In some examples, an example method may be encoded as computer-readable instructions on a computer-readable medium. For example, a computer-readable medium may include one or more computer-executable instructions that, when executed by at least one processor of a computing device, may cause the computing device to control a fluidic input signal provided to a fluidic circuit. A fluidic circuit may include a fluidic difference circuit configured to provide a fluidic difference output based on a difference between the first fluidic input signal and the second fluidic input signal. In some examples, the difference between the first fluidic input signal and the second fluidic input signal may be a pressure difference. A fluidic circuit may include a fluidic buffer amplifier configured to amplify the flow rate of a fluidic signal, while in some cases not appreciably amplifying the pressure of the fluidic signal, to provide a fluidic output signal. The fluidic output signal may be provided to a haptic device and/or an actuator. In some examples, a method may further include providing a fluidic circuit that includes a pair of fluidic valves and may further include using a fluidic flow mirror to balance flows to each of the pair of fluidic devices In some examples, a device includes a fluidic circuit configured to receive a fluidic input, and provide a fluidic output based on the fluidic input. In some examples, the fluidic output may be approximately linearly dependent on the fluidic input. In some examples, a fluidic output may have an output flow rate that is based on (and in some examples approximately proportional to) a fluidic input pressure. In some examples, a fluidic output may be a difference signal that is based on (e.g., correlated with) a difference between a fluidic input and a fluidic bias (e.g., a fluidic input pressure and a fluidic bias pressure). A device may include a fluidic amplifier, configured to receive, for example, a fluidic difference output and provide a device fluidic output based on the fluidic difference output.

In some examples, a method includes receiving, by a fluidic circuit, an input signal (e.g., having a pressure, flow rate, mechanical displacement, or some combination thereof), and generating an output signal (e.g., having a pressure, flow rate, mechanical displacement, or some combination thereof). The fluidic circuit may include at least one relative area fluidic valve. The output signal may be substantially proportional to the input signal. For example, an output flow rate and/or output pressure may be substantially proportional to an input flow rate and/or input pressure. In some examples, a method is performed using, for example, partial actuation of at least one fluidic valve, for example, a relative area valve. In some examples, a fluidic input may be generated by a mechanical input (such as a pressure), an electrically generated flow and/or pressure, or other mechanism or combination thereof. In some examples, an output pressure and/or an output flow rate may be used to generate a mechanical output, such as an actuation, haptic feedback or other human-perceptible output. In some examples, methods may include pressure-based feedback. Examples also include apparatus and systems configured to perform fluidic amplification by such methods.

In some examples, a fluidic circuit may have an output, an input, and a bias input, wherein the output is based on the difference between the input and the bias input. In some examples, an apparatus includes a fluidic differential amplifier. In some examples, a method of fluidic input includes provision of feedback between a fluidic output and a fluidic input. In some examples, fluidic feedback may include negative fluidic input, which may be used to achieve one or more of: reducing fluidic gain, improving amplification linearity, circuit stabilization, or other performance modification. In some examples, fluidic feedback may include fluidic positive feedback, which may be used to achieve one or more of: increased fluidic gain, output saturation, output latching (including output pseudo-latching), oscillation, or other performance modification. Fluidic feedback may include provision of a fluid channel fluidically interconnecting an output to an input. Negative fluidic feedback may provide a signal to the circuit input that tends to reduce the output signal that provides the negative fluidic feedback.

Fluidic analog circuits can be used to provide a proportional response, for example, between an input pressure and/or flow rate, and an output pressure and/or flow rate. This may contrast with fluidic valves used as on/off switches. However, at high gain, an analog circuit may provide a non-linear or even a digital-like response. An example analog fluidic circuit may include one or more fluidic valves, such as a 3-terminal fluidic valve, which may be termed a fluidic transistor, and may be used in combination with a fluidic load. The fluidic transistor may have an intrinsic gain (e.g., controlled by area ratios within the valve structure), and effective gain may be determined by load size. An analog output may be located between a fluidic valve terminal (such as an inlet (source) or outlet (drain)) and the load. In some examples, a fluidic circuit may include one or more orifice inflow chokes, for example, to provide flow impedance. In some examples, an analog fluidic circuit may include a normally open/normally closed pair of 3-terminal fluidic valves. In some examples, a fluidic circuit or a portion thereof may be configured as a flow mirror, using a single input to the gate terminals of a pair of fluidic transistors. In some examples, a fluidic circuit may be configured as a fluidic differential pair, which may be used as part of a fluidic operational amplifier. Applications include haptics, proportional control, chemical processes engineering, biochemical processing, and hydraulic control.

Embodiments of the instant disclosure may include or be implemented in conjunction with various types of artificial reality systems. Artificial reality is a form of reality that has been adjusted in some manner before presentation to a user, which may include, for example, a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs).

Figure 15:
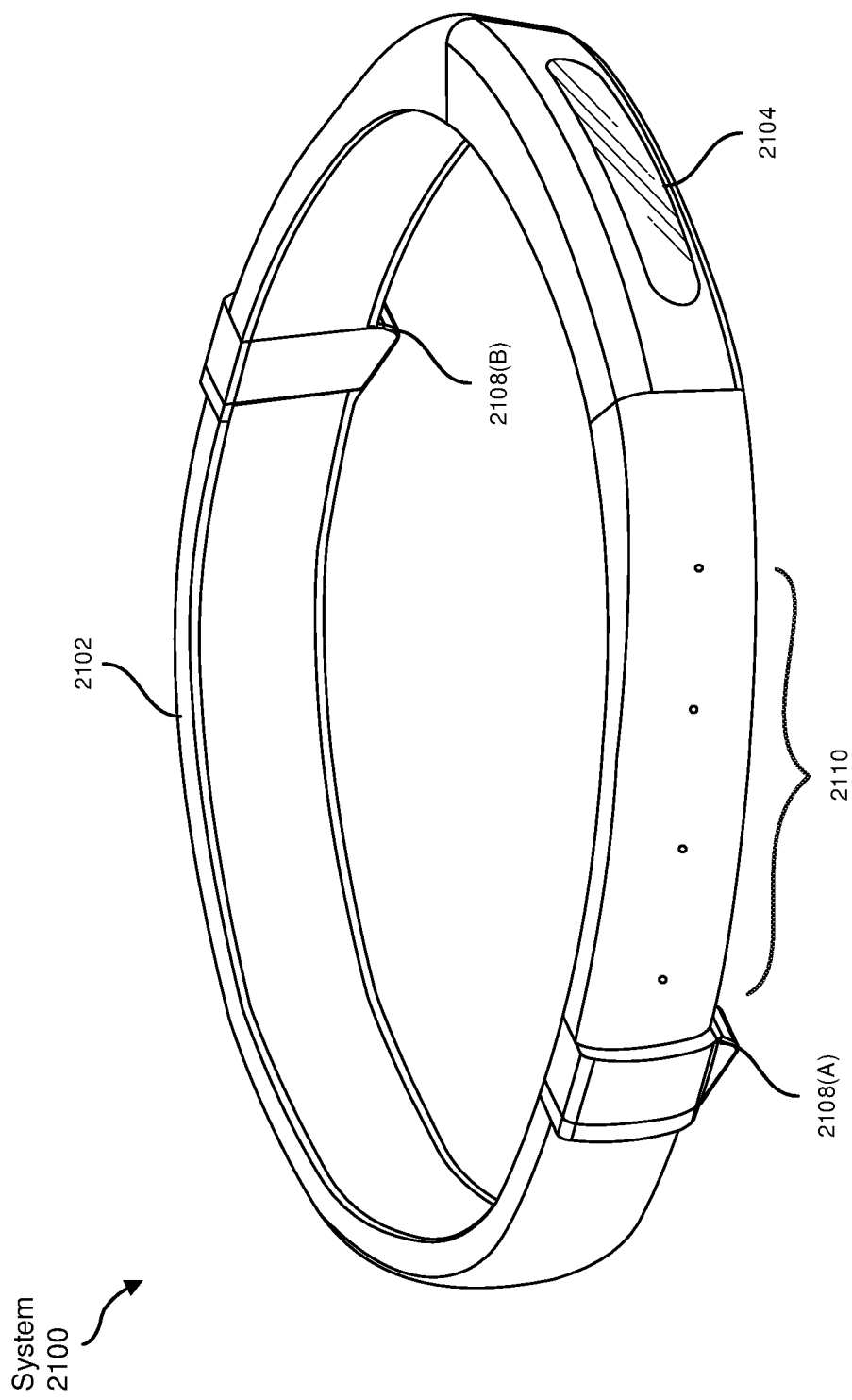
FIG. 15 shows an AR system that includes a wearable device in accordance with some embodiments.

FIG. 15 shows an example AR system 2100. Other artificial reality systems may include an NED that also provides visibility into the real world (e.g., AR system 2200 in FIG. 16) or that visually immerses a user in an artificial reality (e.g., VR system 2300 in FIG. 17). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 15, AR system 2100 generally represents a wearable device dimensioned to fit about a body part (e.g., a head) of a user. As shown in FIG. 15, system 2100 may include a frame 2102 and a camera assembly 104 that is coupled to frame 2102 and configured to gather information about a local environment by observing the local environment. AR system 2100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 2100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 2100 may not include an NED, AR system 2100 may include other types of screens or visual feedback devices (e.g., a display screen integrated into a side of frame 2102).

Figure 16:
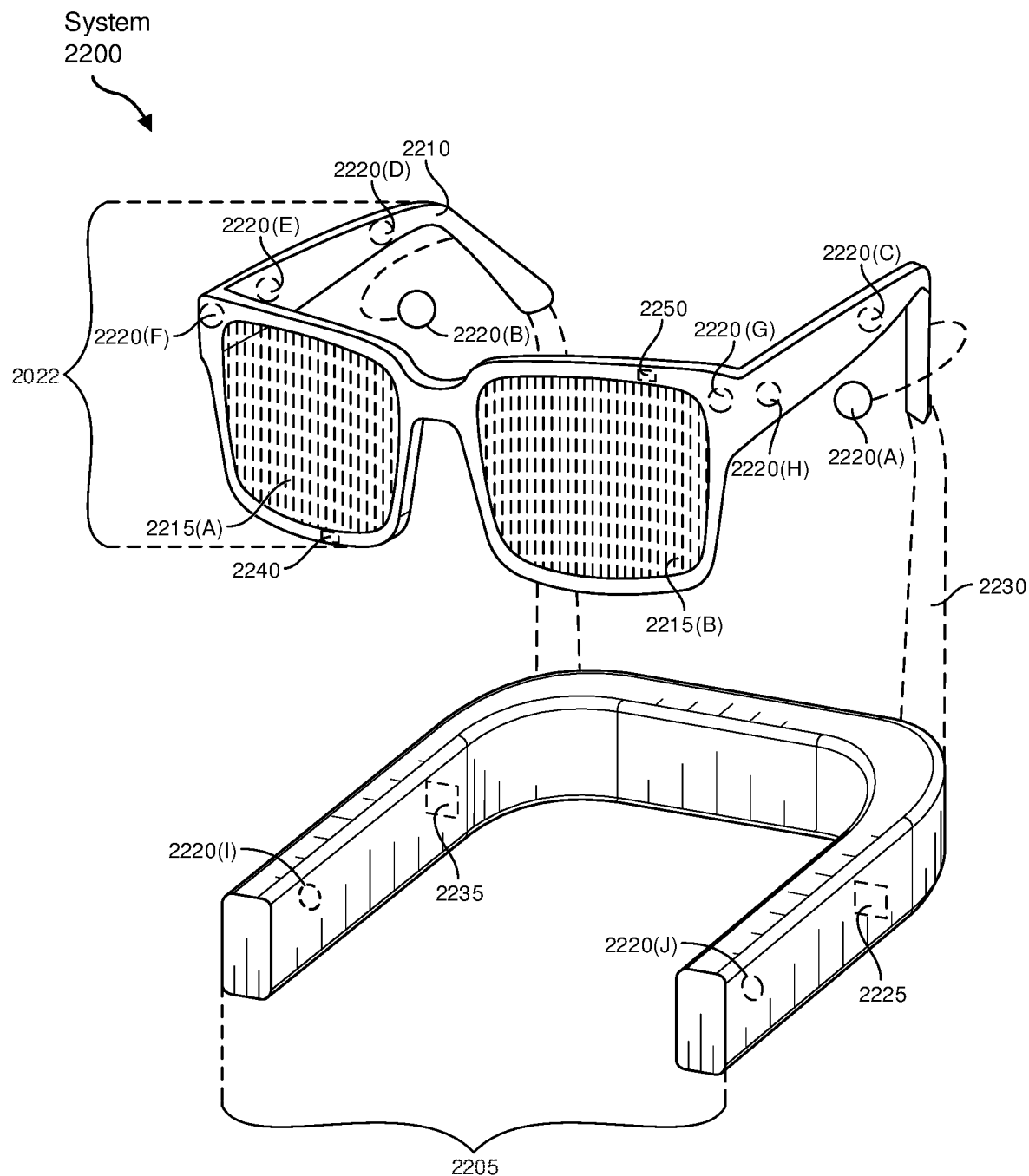
FIG. 16 shows an AR system that includes an eyewear device in accordance with some embodiments.

The embodiments discussed in this disclosure may also be implemented in AR systems that include one or more NEDs, such as a system as shown in FIG. 16.

FIG. 16 shows an AR system 2200 that includes an eyewear device 2202 with a frame 2210 configured to hold a left display device 2215(A) and a right display device 215(B) in front of a user's eyes. Display devices 2215(A) and 2215(B) may act together or independently to present an image or series of images to a user. While AR system 2200 includes two displays, embodiments of this disclosure may be implemented in AR systems with a single NED or more than two NEDs.

In some embodiments, AR system 2200 may include one or more sensors, such as sensor 240. Sensor 240 may generate measurement signals in response to motion of AR system 200 and may be located on substantially any portion of frame 2210. Sensor 2240 may include a position sensor, an inertial measurement unit (IMU), a depth camera assembly, or any combination thereof. In some embodiments, AR system 2200 may or may not include sensor 240 or may include more than one sensor. In embodiments in which sensor 2240 includes an IMU, the IMU may generate calibration data based on measurement signals from sensor 2240. Examples of sensor 2240 may include, without limitation, accelerometers, gyroscopes, magnetometers, other suitable types of sensors that detect motion, sensors used for error correction of the IMU, or some combination thereof.

AR system 2200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 16 may include, for example, ten acoustic sensors: 2220(A) and 2220(B), which may be designed to be placed inside a corresponding ear of the user, acoustic sensors 2220(C), 2220(D), 2220(E), 2220(F), 2220(G), and 2220(H), which may be positioned at various locations on frame 2210, and/or acoustic sensors 2220(I) and 220(J), which may be positioned on a corresponding neckband 2205.

The configuration of acoustic sensors 2220 of the microphone array may vary. While AR system 2200 is shown in FIG. 16 as having ten acoustic sensors 2220, the number of acoustic sensors 2220 may be greater or less than ten. In some embodiments, using higher numbers of acoustic sensors 2220 may increase the amount of audio information collected and/or the sensitivity and accuracy of the audio information. In contrast, using a lower number of acoustic sensors 2220 may decrease the computing power required by the controller 2250 to process the collected audio information. In addition, the position of each acoustic sensor 2220 of the microphone array may vary. For example, the position of an acoustic sensor 2220 may include a defined position on the user, a defined coordinate on the frame 2210, an orientation associated with each acoustic sensor, or some combination thereof.

Acoustic sensors 2220(A) and 2220(B) may be positioned on different parts of the user's ear, such as behind the pinna or within the auricle or fossa. Or, there may be additional acoustic sensors on or surrounding the ear in addition to acoustic sensors 2220 inside the ear canal. Having an acoustic sensor positioned next to an ear canal of a user may enable the microphone array to collect information on how sounds arrive at the ear canal. By positioning at least two of acoustic sensors 2220 on either side of a user's head (e.g., as binaural microphones), AR device 200 may simulate binaural hearing and capture a 3D stereo sound field around about a user's head. In some embodiments, acoustic sensors 2220(A) and 2220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 2220 on frame 2210 may be positioned along the length of the temples, across the bridge, above or below display devices 2215(A) and 2215(B), or some combination thereof. Acoustic sensors 2220 may be oriented such that the microphone array is able to detect sounds in a wide range of directions surrounding the user wearing the AR system 200. In some embodiments, an optimization process may be performed during manufacturing of AR system 2200 to determine relative positioning of each acoustic sensor 220 in the microphone array.

AR system 2200 may further include or be connected to an external device (e.g., a paired device), such as neckband 2205. As shown, neckband 2205 may be coupled to eyewear device 202 via one or more connectors 2230. Connectors 230 may be wired or wireless connectors and may include electrical and/or non-electrical (e.g., structural) components. In some cases, eyewear device 2202 and neckband 2205 may operate independently without any wired or wireless connection between them. While FIG. 16 illustrates the components of eyewear device 2202 and neckband 2205 in example locations on eyewear device 2202 and neckband 2205, the components may be located elsewhere and/or distributed differently on eyewear device 2202 and/or neckband 2205. In some embodiments, the components of eyewear device 2202 and neckband 2205 may be located on one or more additional peripheral devices paired with eyewear device 2202, neckband 2205, or some combination thereof. Furthermore, neckband 2205 generally represents any type or form of paired device. Thus, the following discussion of neckband 2205 may also apply to various other paired devices, such as smart watches, smart phones, wrist bands, other wearable devices, hand-held controllers, tablet computers, laptop computers, etc.

Pairing external devices, such as neckband 2205, with AR eyewear devices may enable the eyewear devices to achieve the form factor of a pair of glasses while still providing sufficient battery and computation power for expanded capabilities. Some or all of the battery power, computational resources, and/or additional features of AR system 2200 may be provided by a paired device or shared between a paired device and an eyewear device, thus reducing the weight, heat profile, and form factor of the eyewear device overall while still retaining desired functionality. For example, neckband 2205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 2205 may be less invasive to a user than weight carried in eyewear device 2202, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 2205 may be communicatively coupled with eyewear device 2202 and/or to other devices. The other devices may provide certain functions (e.g., tracking, localizing, depth mapping, processing, storage, etc.) to AR system 2200. In the embodiment of FIG. 16, neckband 205 may include two acoustic sensors (e.g., 2220(I) and 2220(J)) that are part of the microphone array (or potentially form their own microphone subarray). Neckband 2205 may also include a controller 2225 and a power source 2235.

Acoustic sensors 2220( ) and 2220(J) of neckband 2205 may be configured to detect sound and convert the detected sound into an electronic format (analog or digital). In the embodiment of FIG. 16, acoustic sensors 2220(I) and 2220 (J) may be positioned on neckband 205, thereby increasing the distance between the neckband acoustic sensors 2220( ) and 2220(J) and other acoustic sensors 220 positioned on eyewear device 202. In some cases, increasing the distance between acoustic sensors 2220 of the microphone array may improve the accuracy of beamforming performed via the microphone array. For example, if a sound is detected by acoustic sensors 2220(C) and 2220(D) and the distance between acoustic sensors 2220(C) and 2220(D) is greater than, for example, the distance between acoustic sensors 2220(D) and 2220(E), the determined source location of the detected sound may be more accurate than if the sound had been detected by acoustic sensors 2220(D) and 2220(E).

Controller 2225 of neckband 2205 may process information generated by the sensors on neckband 205 and/or AR system 2200. For example, controller 2225 may process information from the microphone array that describes sounds detected by the microphone array. For each detected sound, controller 2225 may perform a DoA estimation to estimate a direction from which the detected sound arrived at the microphone array. As the microphone array detects sounds, controller 2225 may populate an audio data set with the information. In embodiments in which AR system 2200 includes an inertial measurement unit, controller 2225 may compute all inertial and spatial calculations from the IMU located on eyewear device 2202. Connector 2230 may convey information between AR system 2200 and neckband 2205 and between AR system 2200 and controller 2225. The information may be in the form of optical data, electrical data, wireless data, or any other transmittable data form. Moving the processing of information generated by AR system 2200 to neckband 2205 may reduce weight and heat in eyewear device 2202, making it more comfortable to the user.

Power source 2235 in neckband 2205 may provide power to eyewear device 2202 and/or to neckband 2205. Power source 2235 may include, without limitation, lithium ion batteries, lithium-polymer batteries, primary lithium batteries, alkaline batteries, or any other form of power storage. In some cases, power source 2235 may be a wired power source. Including power source 2235 on neckband 2205 instead of on eyewear device 2202 may help better distribute the weight and heat generated by power source 2235.

As noted, some artificial reality systems may, instead of blending an artificial reality with actual reality, substantially replace one or more of a user's sensory perceptions of the real world with a virtual experience.

Figure 17:
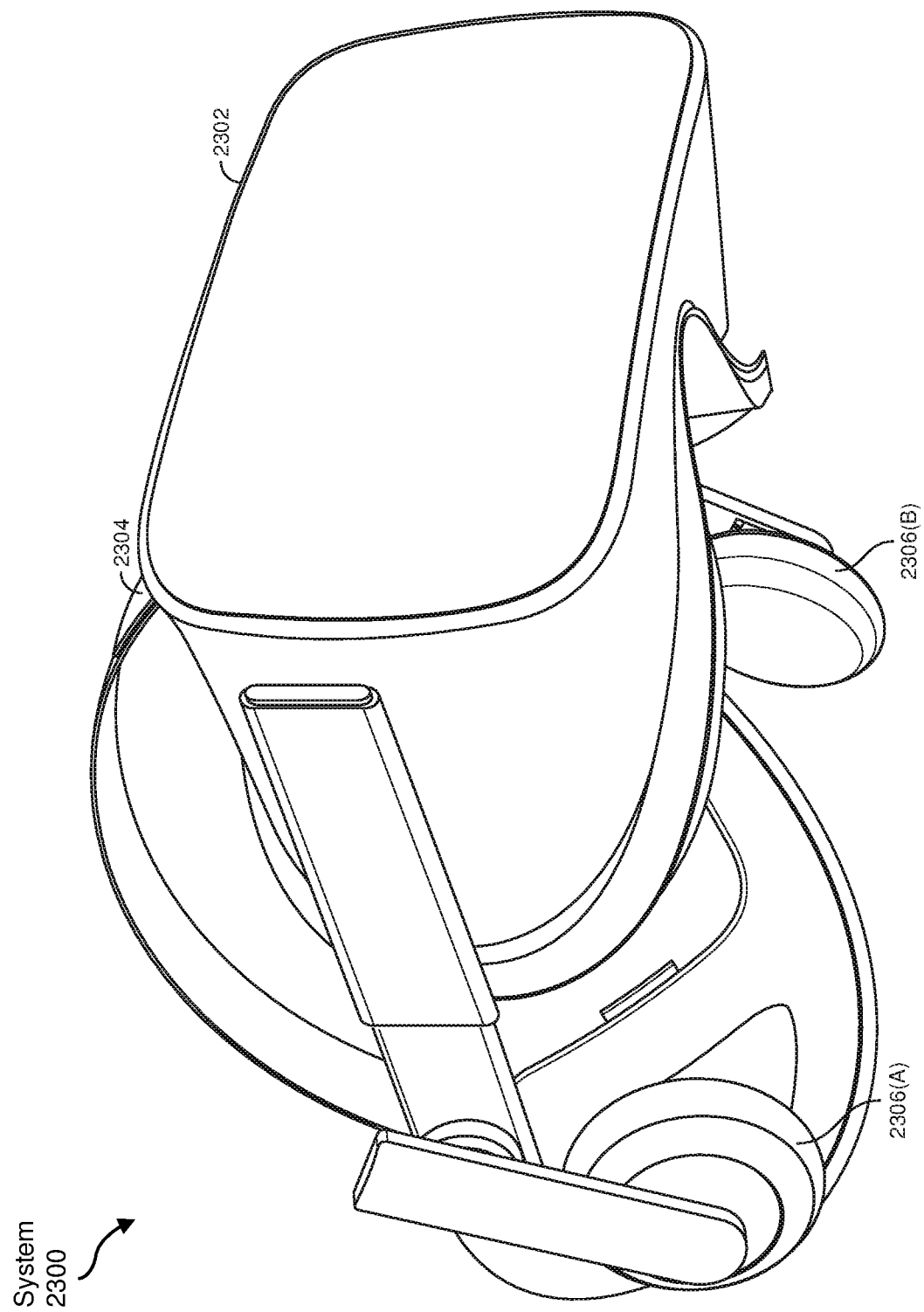
FIG. 17 shows an AR system that includes a head-worn display in accordance with some embodiments.

FIG. 17 shows an example of this type of system is in the form of a head-worn display system, such as VR system 2300, that mostly or completely covers a user's field of view. VR system 300 may include a front rigid body 2302 and a band 2304 shaped to fit around a user's head. VR system 2300 may also include output audio transducers 2306(A) and 2306(B). Furthermore, while not shown in FIG. 17, front rigid body 2302 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in AR system 2200 and/or VR system 2300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 2200 and/or VR system 2300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 2100, AR system 2200, and/or VR system 2300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 15 and 17, output audio transducers 2108 (A), 2108(B), 2306(A), and 2306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 2110 may include condenser microphones, dynamic microphones, ribbon microphones, and/or any other type or form of input transducer. In some embodiments, a single transducer may be used for both audio input and audio output.

While not shown in FIGS. 15-17, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments. Haptic sensations may be provided by fluidic circuits described herein, for example, providing a fluidic output signal having time-dependent pressure and/or flow rate to a haptic device. In some examples, a fluidic circuit may provide a fluidic output signal to a fluidic speaker, configured to convert variations in flow rate and/or pressure to an acoustic signal.

An artificial reality device may include one or more types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may be configured to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

In some embodiments, an AR system such as described in relation to FIG. 15, 16, or 17, may include a fluidic circuit as described herein, such as a fluidic amplifier. In some examples, a fluidic amplifier may provide a fluidic output to a haptic device, or other actuator.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

As noted, artificial reality systems may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). In some examples, haptic feedback may be provided using a fluidic device. For example, a fluidic circuit (such as a fluidic circuit described herein) may be used to provide a time-dependent fluidic signal (e.g., including a time-dependent fluid pressure and/or flow rate) to a haptic device. The time-dependent fluidic signal may induce a perceptible vibration, pressure, actuation, or other tactile signal to a user. In some examples, an output load of a fluidic circuit may include a haptic device, such as a vibrotactor.

Figure 18:
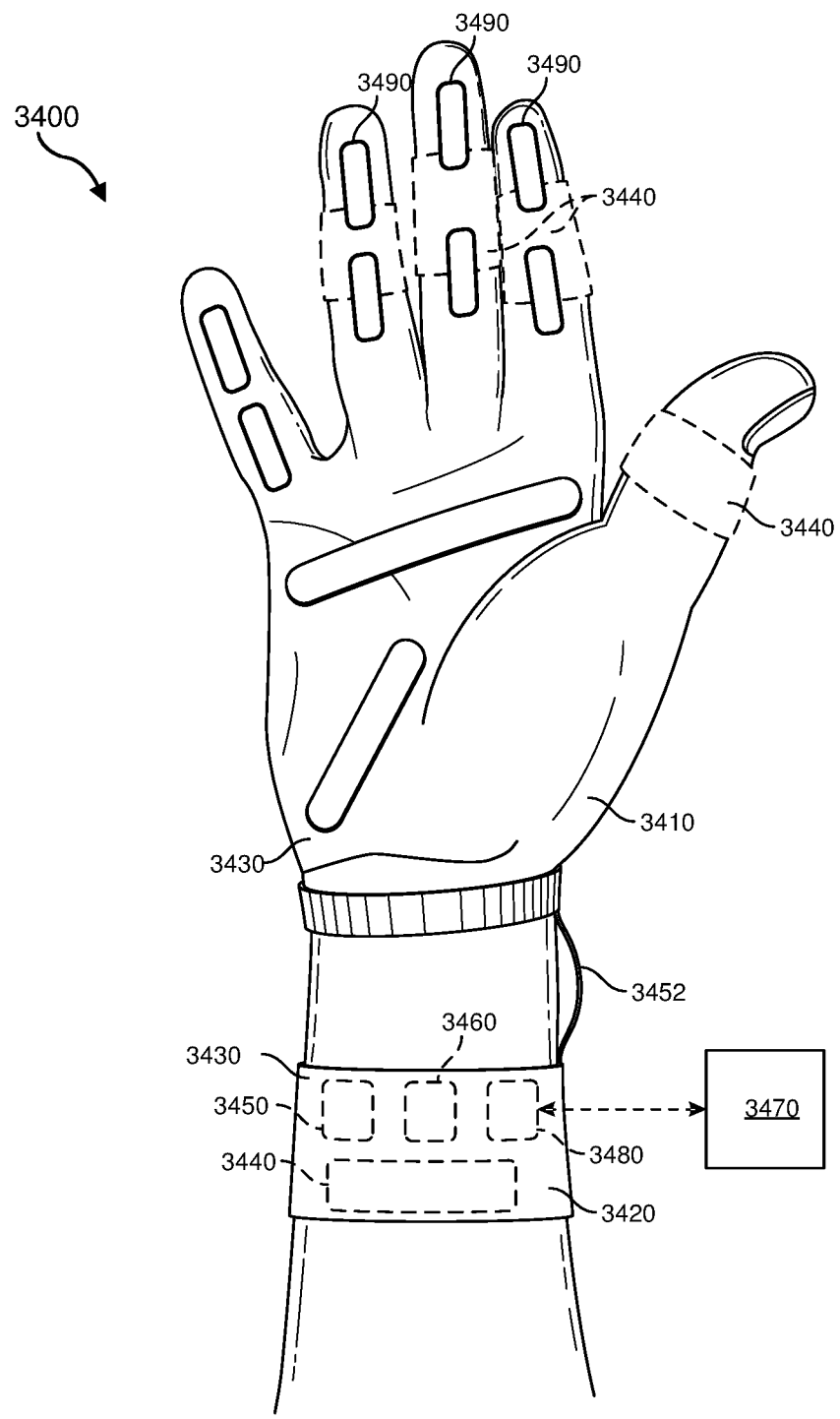
FIG. 18 is an illustration of exemplary haptic devices that may be used in connection with embodiments of this disclosure.

As an example, FIG. 18 illustrates a vibrotactile system 3400 in the form of a wearable glove (haptic device 3410) and wristband (haptic device 3420). Haptic device 3410 and haptic device 3420 are shown as examples of wearable devices that include a flexible, wearable textile material 3430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 3440 may be positioned at least partially within one or more corresponding pockets formed in textile material 3430 of vibrotactile system 3400. Vibrotactile devices 3440 may be positioned in locations to provide a vibrating sensation (e.g., haptic feedback) to a user of vibrotactile system 3400. For example, vibrotactile devices 3440 may be positioned to be against the user's finger(s), thumb, or wrist, as shown in FIG. 18. Vibrotactile devices 3440 may, in some examples, be sufficiently flexible to conform to or bend with the user's corresponding body part(s).

A power source 3450 (e.g., a battery) for applying a voltage to the vibrotactile devices 3440 for activation thereof may be electrically coupled to vibrotactile devices 3440, such as via conductive wiring 3452. In some examples, each of vibrotactile devices 3440 may be independently electrically coupled to power source 3450 for individual activation. In some embodiments, a processor 3460 may be operatively coupled to power source 3450 and configured (e.g., programmed) to control activation of vibrotactile devices 3440.

Vibrotactile system 3400 may be implemented in a variety of ways. In some examples, vibrotactile system 3400 may be a standalone system with integral subsystems and components for operation independent of other devices and systems. As another example, vibrotactile system 3400 may be configured for interaction with another device or system 3470. For example, vibrotactile system 3400 may, in some examples, include a communications interface 3480 for receiving and/or sending signals to the other device or system 3470. The other device or system 3470 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 3480 may enable communications between vibrotactile system 3400 and the other device or system 3470 via a wireless (e.g., Wi-Fi, Bluetooth, cellular, radio, etc.) link or a wired link. If present, communications interface 3480 may be in communication with processor 3460, such as to provide a signal to processor 3460 to activate or deactivate one or more of the vibrotactile devices 3440.

Vibrotactile system 3400 may optionally include other subsystems and components, such as touch-sensitive pads 3490, pressure sensors, motion sensors, position sensors, lighting elements, and/or user interface elements (e.g., an on/off button, a vibration control element, etc.). During use, vibrotactile devices 3440 may be configured to be activated for a variety of different reasons, such as in response to the user's interaction with user interface elements, a signal from the motion or position sensors, a signal from the touch-sensitive pads 3490, a signal from the pressure sensors, a signal from the other device or system 3470, etc.

Although power source 3450, processor 3460, and communications interface 480 are illustrated in FIG. 18 as being positioned in haptic device 3420, the present disclosure is not so limited. For example, one or more of power source 3450, processor 3460, or communications interface 3480 may be positioned within haptic device 3410 or within another wearable textile.

Figure 19:
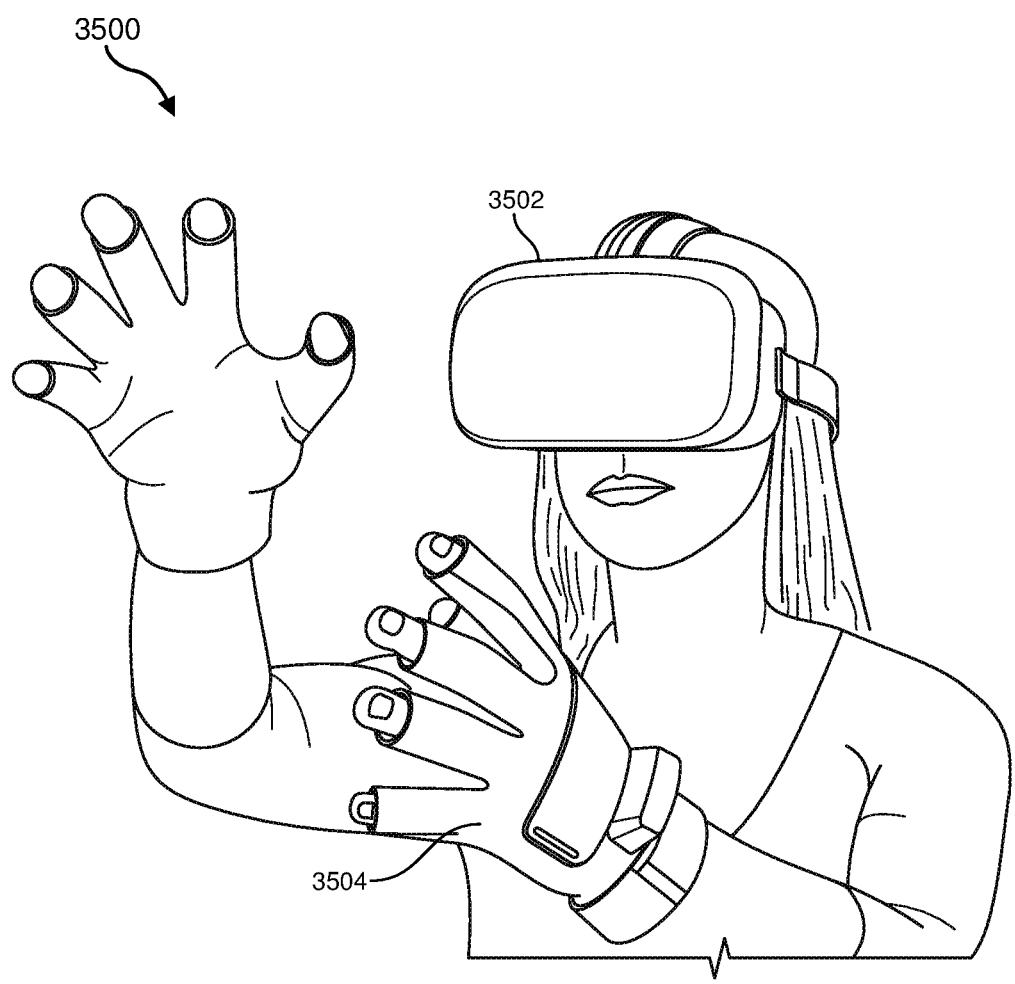
FIG. 19 is an illustration of an exemplary virtual-reality environment according to embodiments of this disclosure.

Haptic wearables, such as those shown in and described in connection with FIG. 18, may be implemented in a variety of types of artificial-reality systems and environments. FIG. 19 shows an example artificial reality environment 500 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system. Head-mounted display 3502 generally represents any type or form of virtual-reality system, such as virtual-reality system 300 in FIG. 3. Haptic device 3504 generally represents any type or form of wearable device, worn by a use of an artificial reality system, that provides haptic feedback to the user to give the user the perception that he or she is physically engaging with a virtual object. In some embodiments, haptic device 3504 may provide haptic feedback by applying vibration, motion, and/or force to the user. For example, haptic device 3504 may limit or augment a user's movement. To give a specific example, haptic device 3504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 3504 to send action requests to a console. Examples of action requests include, without limitation, requests to start an application and/or end the application and/or requests to perform a particular action within the application.

Figure 20:
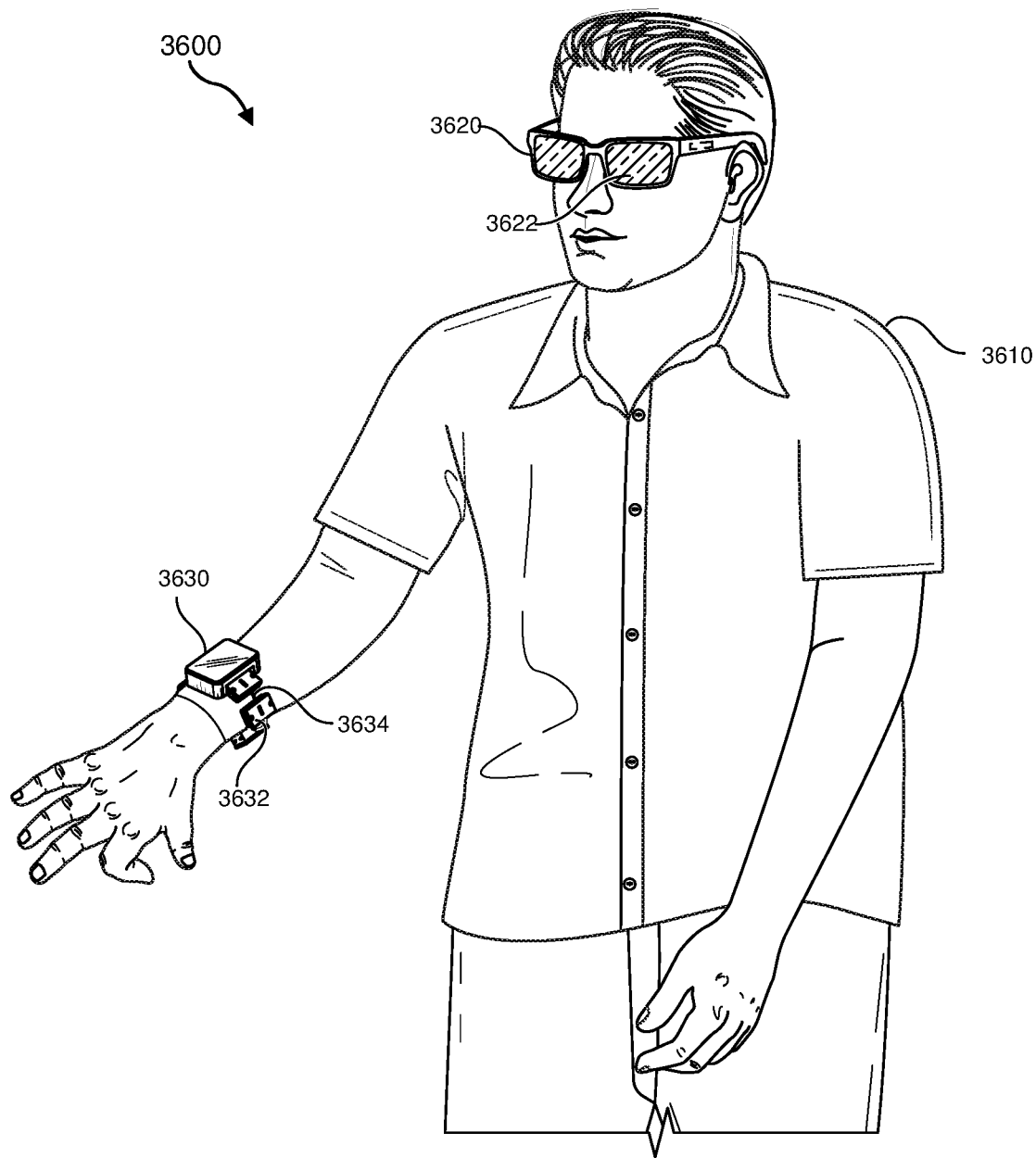
FIG. 20 is an illustration of an exemplary augmented-reality environment according to embodiments of this disclosure Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

While haptic interfaces may be used with virtual-reality systems, as shown in FIG. 19, haptic interfaces may also be used with augmented-reality systems, as shown in FIG. 20. FIG. 20 is a perspective view a user 3610 interacting with an augmented-reality system 600. In this example, user 3610 may wear a pair of augmented-reality glasses 3620 that have one or more displays 3622 and that are paired with a haptic device 3630. Haptic device 3630 may be a wristband that includes a plurality of band elements 3632 and a tensioning mechanism 3634 that connects band elements 3632 to one another.

One or more of band elements 3632 may include any type or form of actuator suitable for providing haptic feedback. For example, one or more of band elements 3632 may be configured to provide one or more of various types of cutaneous feedback, including vibration, force, traction, texture, and/or temperature. To provide such feedback, band elements 3632 may include one or more of various types of actuators. In one example, each of band elements 3632 may include a vibrotactor (e.g., a vibrotactile actuator) configured to vibrate in unison or independently to provide one or more of various types of haptic sensations to a user. Alternatively, only a single band element or a subset of band elements may include vibrotactors.

In some examples, the output load of a fluidic circuit may include one or more vibrotactors. A fluidic circuit may be used to provide a perceptible mechanical feedback to a body part of a user. In some examples, the body part may be a portion of the head, neck, arms, hands, torso, legs, feet, or other body part of a user.

Haptic devices may include any suitable number and/or type of haptic transducer, sensor, and/or feedback mechanism. For example, haptic devices may include one or more mechanical transducers, piezoelectric transducers, and/or fluidic transducers. Haptic devices may also include various combinations of different types and forms of transducers that work together or independently to enhance a user's artificial-reality experience. In one example, each of band elements 3632 of haptic device 3630 may include a vibrotactor (e.g., a vibrotactile actuator) configured to vibrate in unison or independently to provide one or more of various types of haptic sensations to a user.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Example functions may include the provision of a fluidic input to a device, computer-controlled actuations in response to a fluidic response (such as a change in a fluidic device output), and determination of sensor data, for example, using the electrical properties of an electroactive transducer. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device, comprising:
   a fluidic differential circuit including a first fluidic valve and a second fluidic valve, configured to receive a fluidic input and a fluidic bias, and provide a fluidic difference output correlated with a difference between the fluidic input and the fluidic bias;
   a fluidic current mirror configured to balance a first fluid flow to the first fluidic valve and a second fluid flow to the second fluidic valve; and
   a fluidic amplifier, configured to receive the fluidic difference output and provide a device fluidic output based on the fluidic difference output.

2. The device of claim 1, wherein:
   the first fluidic valve has a first source, a first drain, and a first gate; and
   the second fluidic valve has a second source, a second drain, and a second gate, wherein:
   the fluidic input is connected to the first gate,
   the fluidic bias is connected to the second gate, and
   the fluidic difference output is obtained by a fluidic connection to the first source or the second source.

3. The device of claim 1, wherein the fluidic current mirror comprises a pair of fluidic valves.

4. The device of claim 1, wherein the fluidic amplifier is a buffer fluidic amplifier having a fluidic pressure gain of approximately unity.

5. The device of claim 1, wherein the fluidic amplifier receives the fluidic difference output having an amplifier input pressure and an amplifier input flow rate, and provides the device fluidic output at a device output pressure and a device output flow rate,
   wherein:
   the device output pressure is approximately equal to the amplifier input pressure, and
   the device output flow rate is greater than the amplifier input flow rate.

6. The device of claim 1, wherein the fluidic amplifier comprises a single fluidic valve.

7. The device of claim 1, wherein the fluidic amplifier comprises a pair of normally open fluidic valves.

8. The device of claim 1, further comprising a fluidic input circuit through which the fluidic input passes, the fluidic input circuit comprising an aperture.

9. The device of claim 1, further comprising a fluidic load configured to receive the device fluidic output.

10. The device of claim 9, wherein the fluidic load comprises an actuator.

11. A device comprising:
    a fluidic differential circuit, configured to receive a fluidic input and a fluidic bias, and provide a fluidic difference output correlated with a pressure difference between the fluidic input and the fluidic bias,
    wherein the fluidic differential circuit comprises
    a first fluidic valve having a first source, a first drain, and a first gate, and
    a second fluidic valve having a second source, a second drain, and a second gate;
    a fluidic current mirror configured to balance a first fluid flow to the first fluidic valve and a second fluid flow to the second fluidic valve; and a fluidic amplifier configured to receive the fluidic difference output and to provide a fluidic output based on the fluidic difference output.

12. The device of claim 11, wherein
the fluidic input is connected to the first gate,
the fluidic bias is connected to the second gate, and
the fluidic difference output is obtained by a fluidic connection to the first source or the second source.

13. The device of claim 11,
wherein the fluidic amplifier is configured to provide flow amplification of the fluidic difference output.

14. The device of claim 13, further comprising a fluidic load, wherein
the fluidic load is configured to receive the fluidic output, and
the fluidic load includes a haptic device.

15. A method comprising:
receiving, by a fluidic differential circuit, a first fluidic input, wherein the fluidic differential circuit includes a first fluidic valve and a second fluidic valve;
receiving, by the fluidic differential circuit, a second fluidic input;
providing, using the fluidic differential circuit, a fluidic difference output correlated with a pressure difference between the first fluidic input and the second fluidic input;
balancing, using a fluidic current mirror, fluid flows to the first fluidic valve and the second fluidic valve of the fluidic differential circuit; and
providing a device fluidic output using a fluidic amplifier configured to receive the fluidic difference output and provide the device fluidic output based on the fluidic difference output.

16. The method of claim 15, wherein providing the device fluidic output further comprising amplifying a flow rate of the fluidic difference output using the fluidic amplifier, to provide the device fluidic output.

17. The method of claim 16, further comprising providing the device fluidic output to a haptic device.

18. The method of claim 15, wherein the fluidic differential circuit comprises a pair of fluidic valves,
the method further comprising using a fluidic flow mirror to balance fluidic flows to each of the pair of fluidic valves.

* * * * *